US012510056B2

(12) United States Patent
Poisler et al.

(10) Patent No.: US 12,510,056 B2
(45) Date of Patent: Dec. 30, 2025

(54) MODULAR SYSTEMS AND METHODS FOR TRANSPORTING TOWER ASSEMBLY OF WIND TURBINE

(71) Applicant: BNSF Logistics, LLC, Dallas, TX (US)

(72) Inventors: Marco A. Poisler, Houston, TX (US); Joseph M. Sindelar, Houston, TX (US)

(73) Assignee: BNSF Logistics, LLC, Dallas, TX (US)

( * ) Notice: Subject to any disclaimer, the term of this patent is extended or adjusted under 35 U.S.C. 154(b) by 478 days.

(21) Appl. No.: 18/075,598

(22) Filed: Dec. 6, 2022

(65) Prior Publication Data

US 2023/0258159 A1 Aug. 17, 2023

Related U.S. Application Data

(60) Provisional application No. 63/294,617, filed on Dec. 29, 2021.

(51) Int. Cl.
*F03D 13/40* (2016.01)
*B60P 3/40* (2006.01)
(Continued)

(52) U.S. Cl.
CPC .............. *F03D 13/402* (2023.08); *B60P 3/40* (2013.01); *B60P 7/12* (2013.01); *B61D 3/166* (2013.01);
(Continued)

(58) Field of Classification Search
CPC .. B60P 3/40; B60P 7/12; F03D 13/042; F03D 13/402; B61D 3/166; B61D 45/003
See application file for complete search history.

(56) References Cited

U.S. PATENT DOCUMENTS 410,227 A 9/1889 Feary
600,428 A 3/1898 Unknown
(Continued)

FOREIGN PATENT DOCUMENTS

DE 2355628 A1 8/1974
DE 3514975 A1 10/1986
(Continued)

OTHER PUBLICATIONS

AIMU Techical Services Committee, "Wind Turbine Paper," Jan. 2012.
(Continued)

*Primary Examiner* — Daniel J Colilla
(74) *Attorney, Agent, or Firm* — Whitaker Chalk Swindle & Schwartz PLLC; Enrique Sanchez, Jr.; Bradley J. Birchfield

(57) ABSTRACT

A system and method are used for transporting a plurality of tower sections of a wind turbine on beds of transport devices, such as flat railcars. Supports affix at support locations on beds to accommodate at least one of the tower sections on each of the transport devices. The supports can include bed supports, such as tabs, extending from the beds, and can include cradle supports with slots that engage on the tabs. A circumferential dimension of a cradle is adjusted on each of the supports against which the tower section rests. Each of the tower sections is then supported with at least two of the supports by loading the tower sections on the transport devices. An end of each of the tower sections is then affixed to a flange on at least one of the supports on each of the transport devices.

19 Claims, 19 Drawing Sheets

(51) Int. Cl.
  *B60P 7/12*    (2006.01)
  *B61D 3/16*    (2006.01)
  *B61D 45/00*   (2006.01)

(52) U.S. Cl.
  CPC ........ *B61D 45/003* (2013.01); *F05B 2260/02* (2013.01)

(56) References Cited

U.S. PATENT DOCUMENTS

| | | | |
|---|---|---|---|
| 751,366 | A | 2/1904 | Unknown |
| 901,815 | A | 10/1908 | Unknown |
| 1,020,012 | A | 3/1912 | Anlauf et al. |
| 2,411,900 | A | 12/1946 | Seward |
| 2,611,495 | A | 9/1952 | Weaver |
| 2,725,241 | A | 11/1955 | Leonard, Jr. |
| 3,001,679 | A | 9/1961 | Canning et al. |
| 3,018,129 | A | 1/1962 | Culver |
| 3,061,255 | A | 10/1962 | Gallo et al. |
| 3,232,636 | A | 2/1966 | Buchanan et al. |
| 3,299,989 | A | 1/1967 | Santosuosso |
| 3,387,813 | A | 6/1968 | Carino |
| 3,922,004 | A | 11/1975 | Chamberlain |
| 4,102,274 | A | 7/1978 | Feary et al. |
| 4,106,735 | A | 8/1978 | Partain et al. |
| 4,219,229 | A | 8/1980 | Ciocan |
| 4,653,967 | A | 3/1987 | Isaksson et al. |
| 4,732,528 | A | 3/1988 | Good |
| 5,076,745 | A | 12/1991 | Klein |
| 5,193,700 | A | 3/1993 | Scott et al. |
| 5,425,608 | A | 6/1995 | Reitnouer |
| 5,579,698 | A | 12/1996 | Lis et al. |
| 5,836,605 | A | 11/1998 | Bowling |
| 5,888,039 | A | 3/1999 | Cooley |
| 5,947,665 | A | 9/1999 | Baur et al. |
| 5,954,465 | A | 9/1999 | Ellerbush |
| 6,113,326 | A | 9/2000 | Nicholson |
| 6,286,435 | B1 | 9/2001 | Kassab et al. |
| 6,543,368 | B1 | 4/2003 | Forbes |
| 7,040,846 | B2 | 5/2006 | Couto |
| 7,210,882 | B2 | 5/2007 | Andersen et al. |
| 7,591,621 | B1 | 9/2009 | Landrum et al. |
| 7,775,753 | B2 | 8/2010 | Pedersen et al. |
| 8,382,407 | B1 | 2/2013 | Landrum et al. |
| 8,491,239 | B2 | 7/2013 | Ferrari |
| 8,500,378 | B1 | 8/2013 | Landrum et al. |
| 8,506,218 | B2 | 8/2013 | Delgado et al. |
| 8,529,174 | B1 | 9/2013 | Landrum et al. |
| 8,690,140 | B2 | 4/2014 | Rasmussen et al. |
| 8,708,625 | B1 | 4/2014 | Landrum et al. |
| 8,967,930 | B2 | 3/2015 | Jespersen |
| 9,683,546 | B1 | 6/2017 | Keller et al. |
| 9,701,236 | B2 | 7/2017 | Thomsen et al. |
| 10,041,479 | B2 | 8/2018 | Pedersen et al. |
| 10,066,606 | B2 | 9/2018 | Thomsen |
| 10,138,649 | B2 | 11/2018 | Pedersen et al. |
| 10,752,154 | B2 | 8/2020 | Keller et al. |
| 10,995,735 | B1 | 5/2021 | Sullivan et al. |
| 2005/0002749 | A1 | 1/2005 | Andersen et al. |
| 2007/0036627 | A1 | 2/2007 | Wright et al. |
| 2009/0308824 | A1* | 12/2009 | Van Belkom ............ B60T 3/00 211/85.18 |
| 2011/0097171 | A1 | 4/2011 | Landrum et al. |
| 2011/0176904 | A1 | 7/2011 | Stiesdal |
| 2017/0210395 | A1 | 7/2017 | Landrum et al. |
| 2021/0170936 | A1 | 6/2021 | Keller et al. |
| 2021/0277875 | A1 | 9/2021 | Ferris |
| 2022/0389910 | A1* | 12/2022 | Nooren .................. F03D 13/40 |

FOREIGN PATENT DOCUMENTS

| | | | |
|---|---|---|---|
| DE | 4417857 A1 | * 11/1995 | ............ B60P 7/12 |
| DE | 202004002100 U1 | * 6/2004 | ........... B60P 7/0892 |
| DE | 202011003305 U | 9/2011 | |
| DE | 102012221937 A1 | 6/2013 | |
| DE | 202014000615 U | 7/2014 | |
| DE | 102012018575 | 5/2015 | |
| EP | 0318960 A1 | 6/1989 | |
| EP | 0382587 A1 | 8/1990 | |
| EP | 2206627 A2 | 7/2010 | |
| EP | 2626547 A1 | 8/2013 | |
| EP | 3967874 A1 | * 3/2022 | ............ E04H 12/34 |
| FR | 2641505 A1 | 7/1990 | |
| FR | 2913380 A1 | 9/2008 | |
| JP | 4999116 B | 8/2012 | |
| WO | 2012003831 A2 | 1/2012 | |
| WO | 2014111093 A1 | 7/2014 | |
| WO | 2015101375 A1 | 7/2015 | |

OTHER PUBLICATIONS

BNSF Railway, "Wind Power Shipments on the BNSF Network," Brochure, Dec. 2015.
Time Marine, "Meeting Expectations: Delivering Reliable Solutions," Brochure, undated, 7-pgs.

* cited by examiner

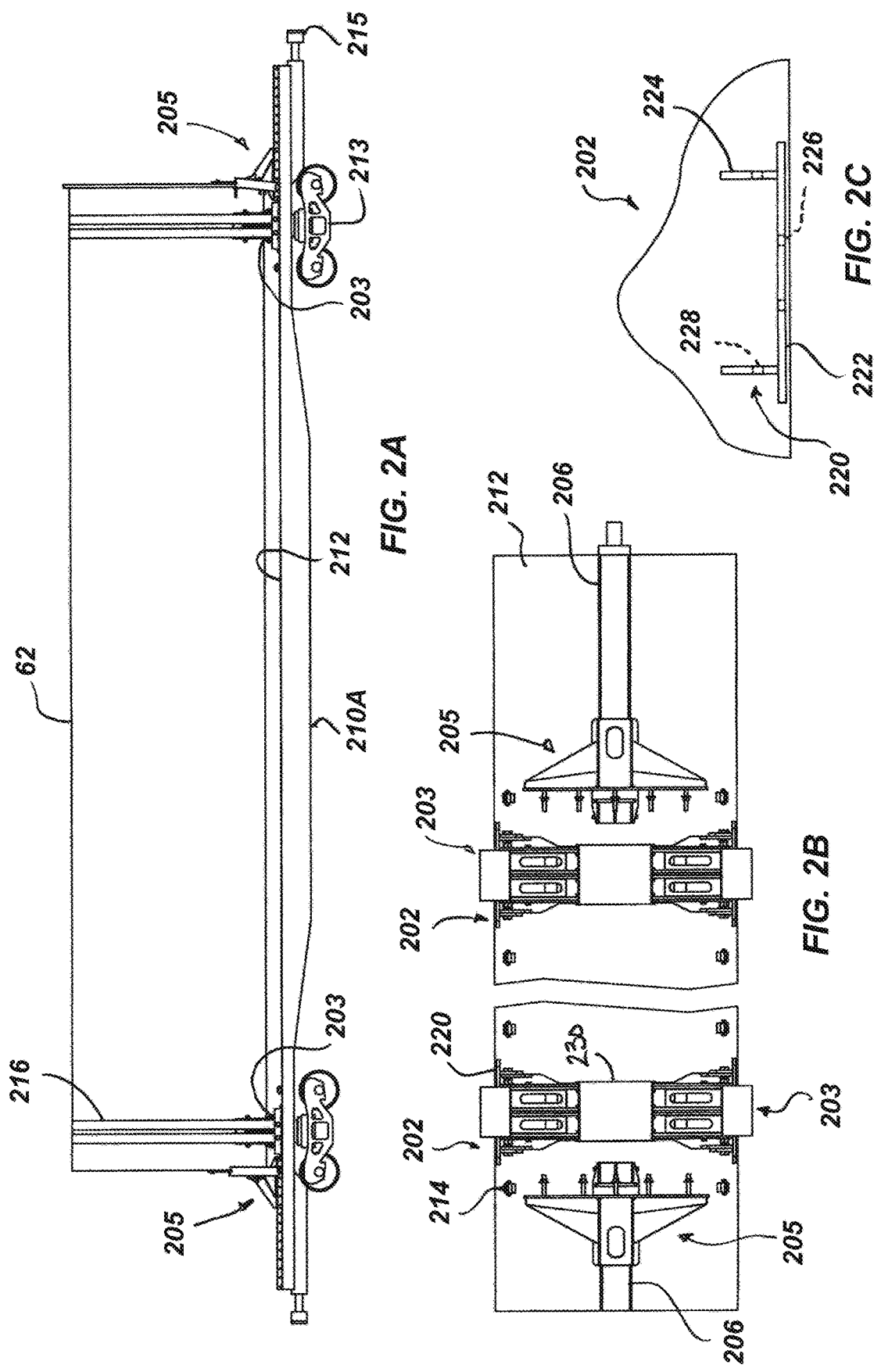

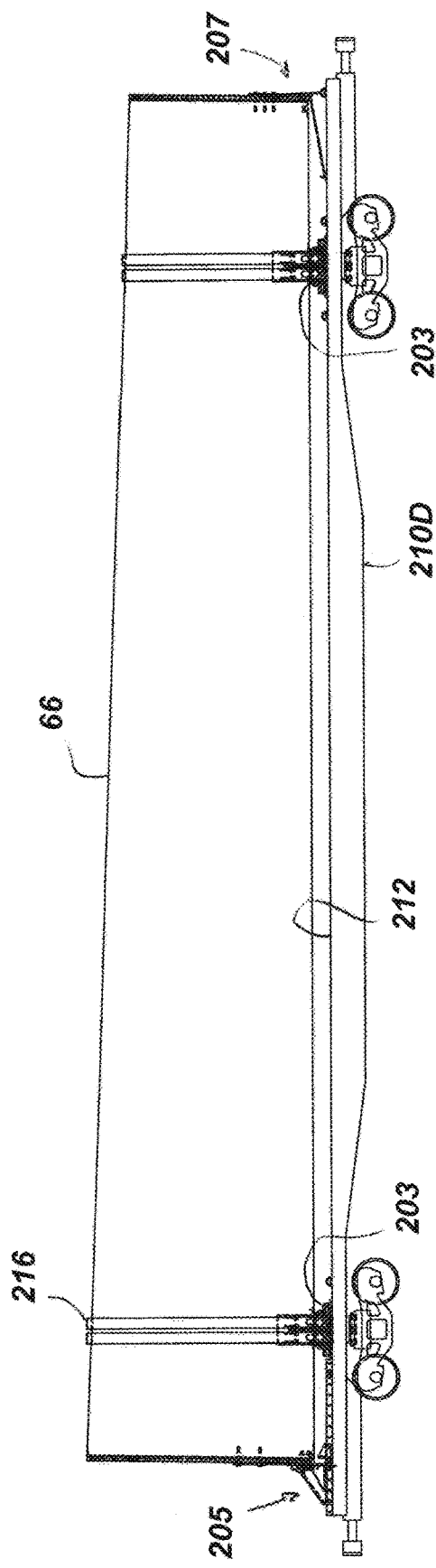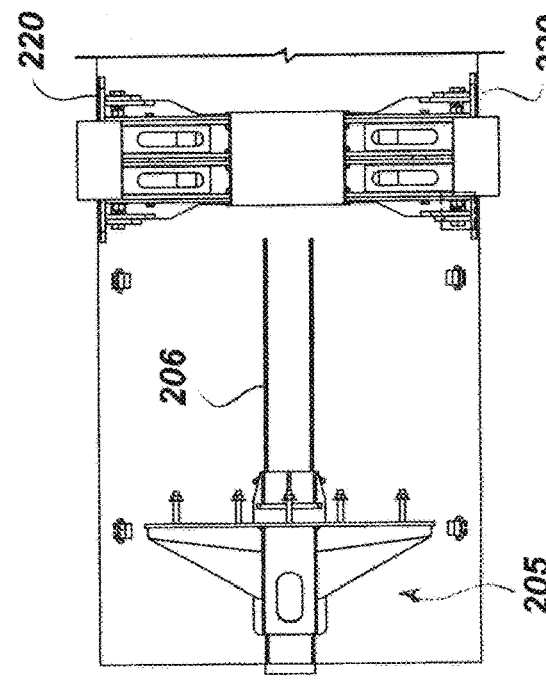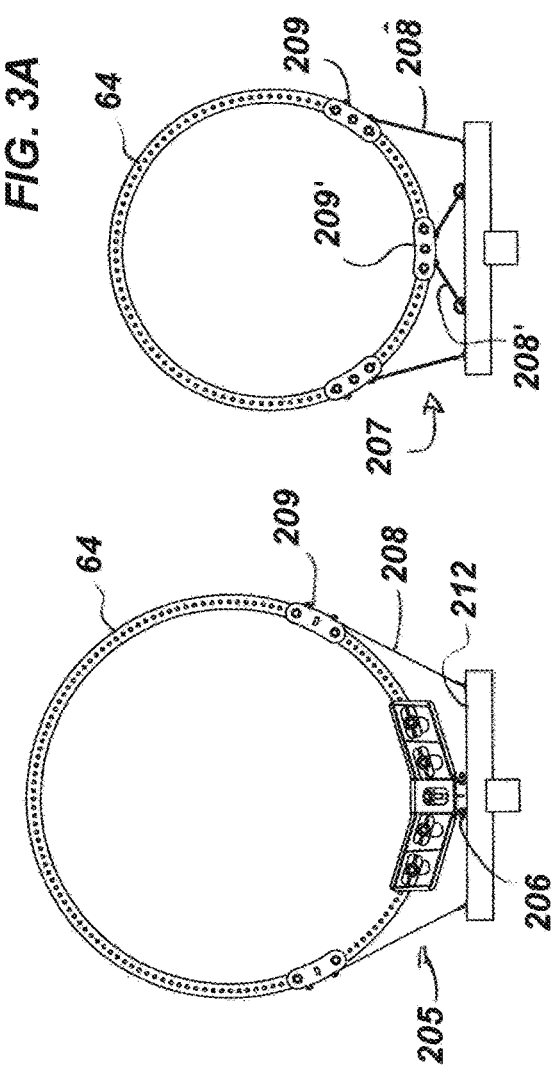

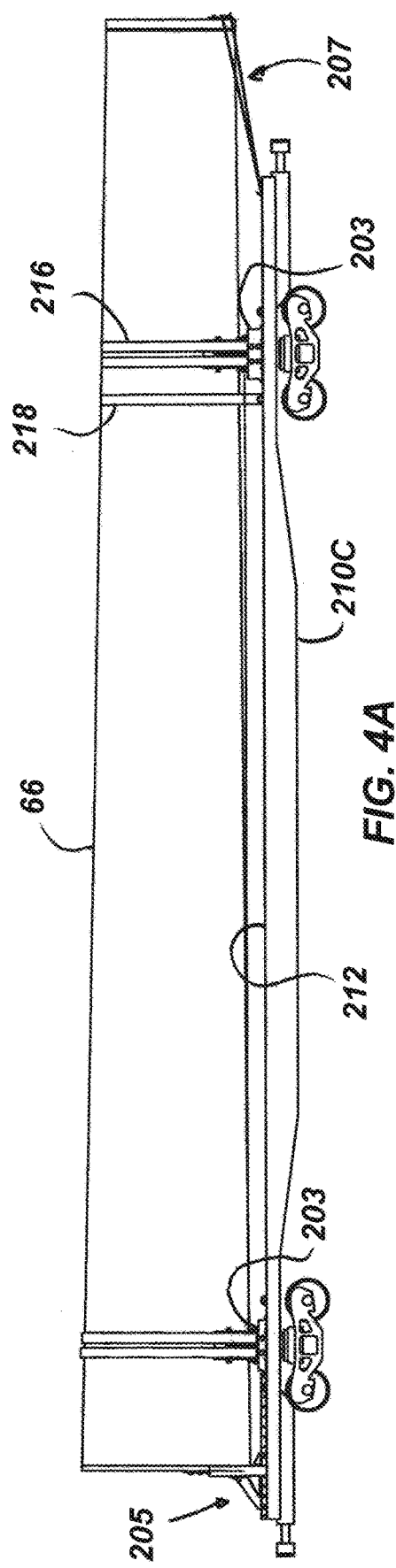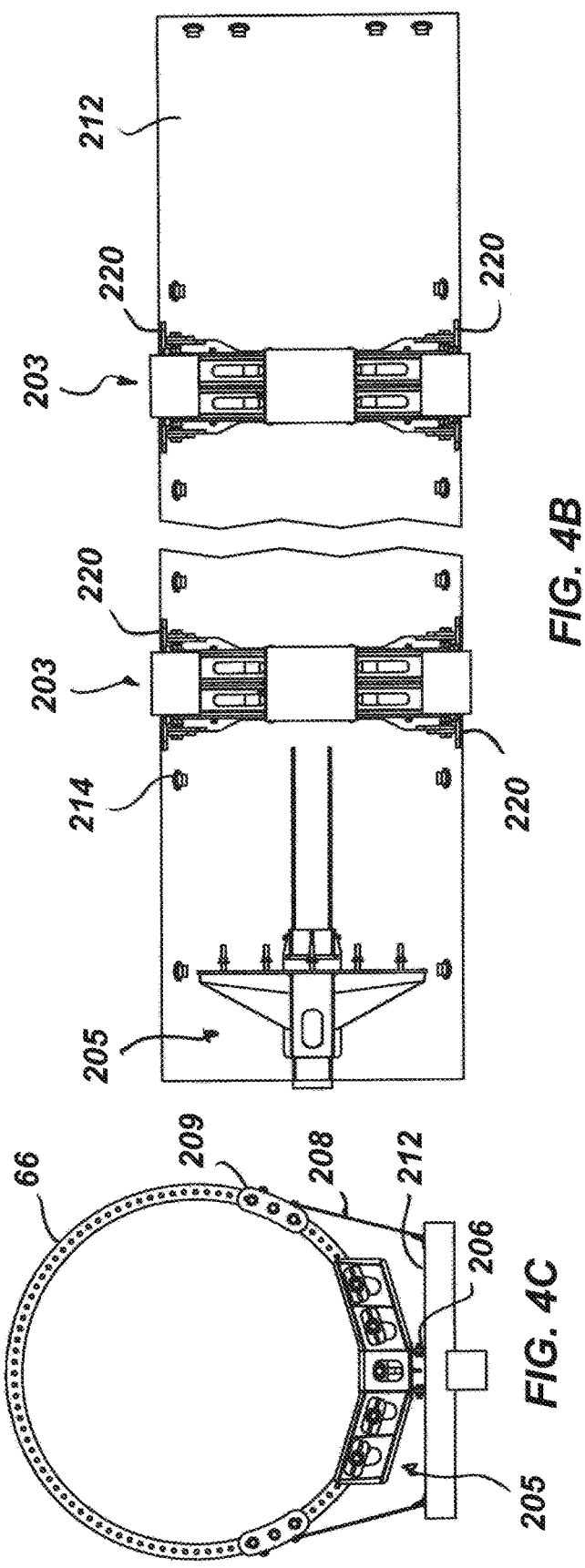
FIG. 4A
FIG. 4B
FIG. 4C

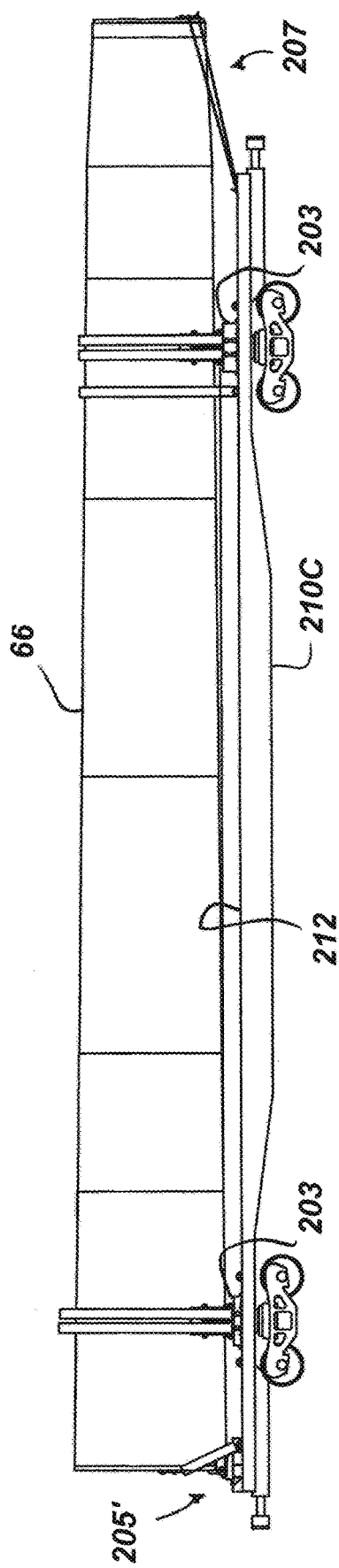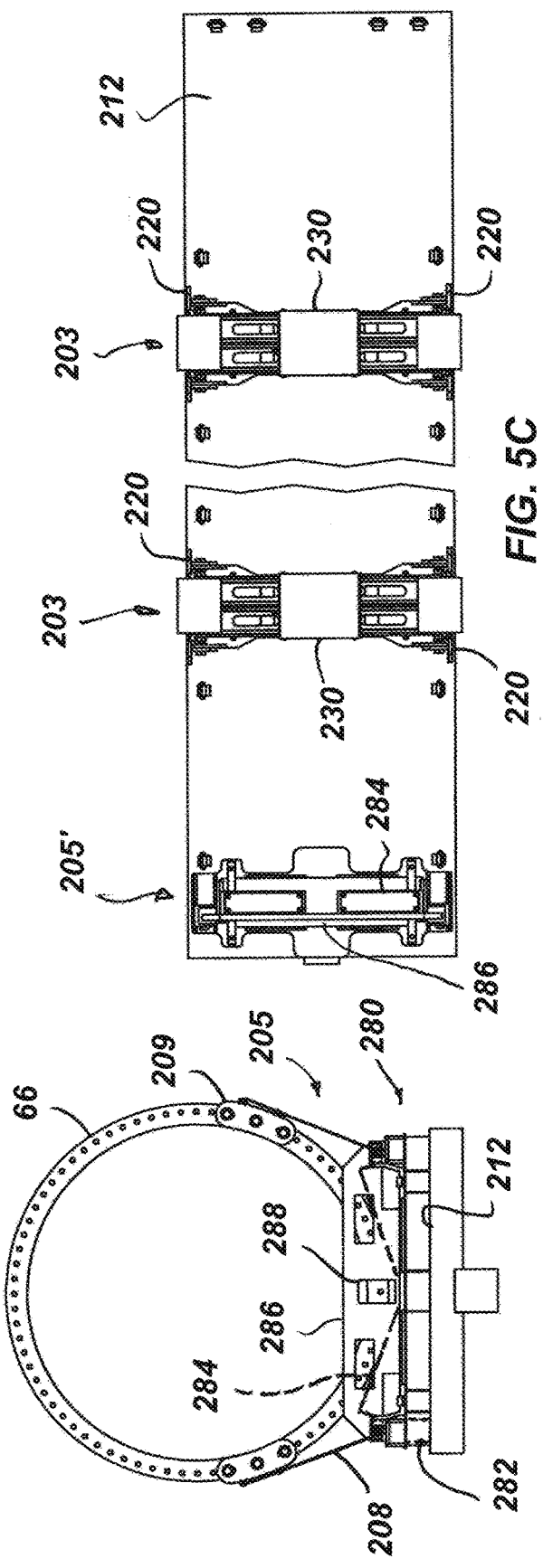
FIG. 5A
FIG. 5B
FIG. 5C

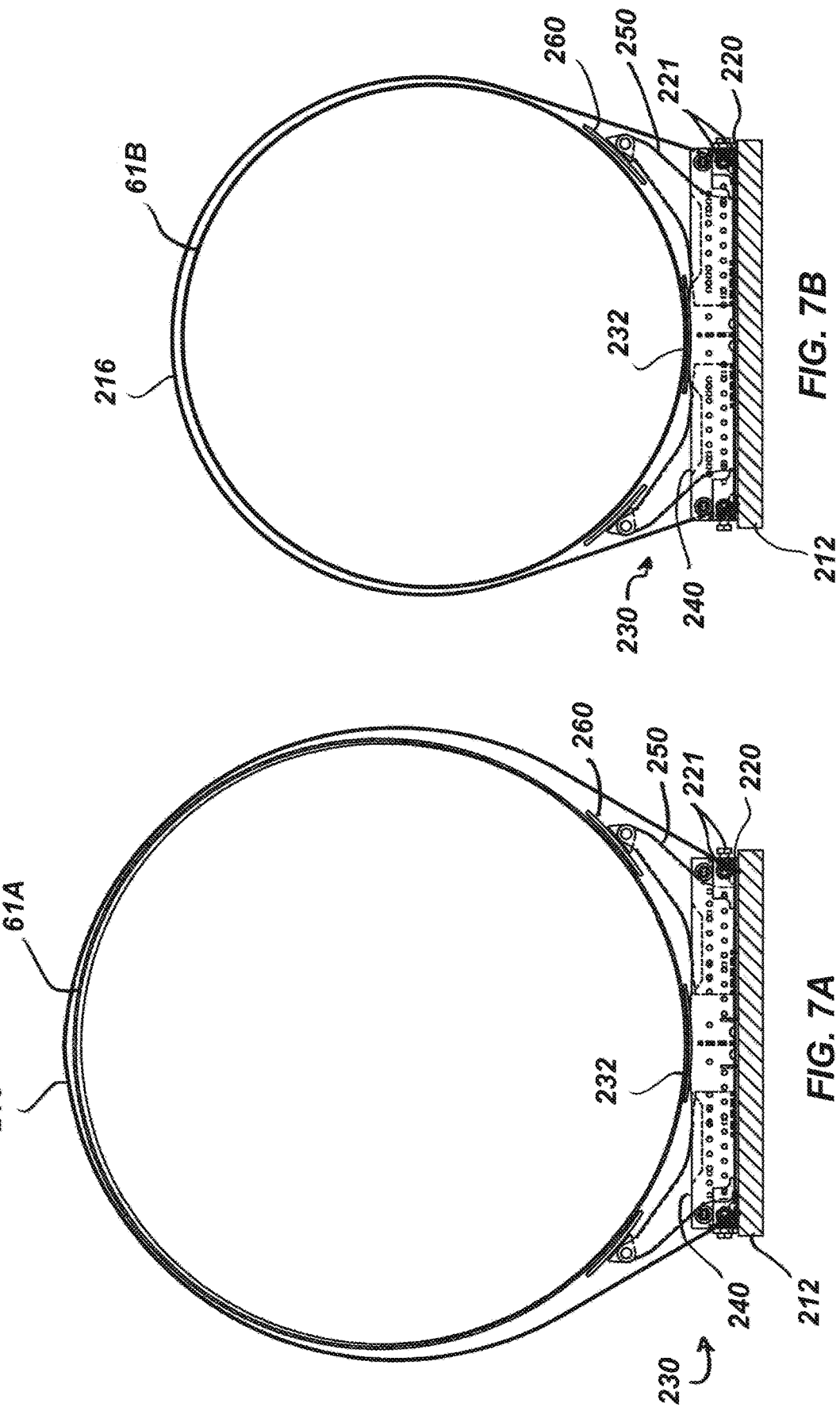

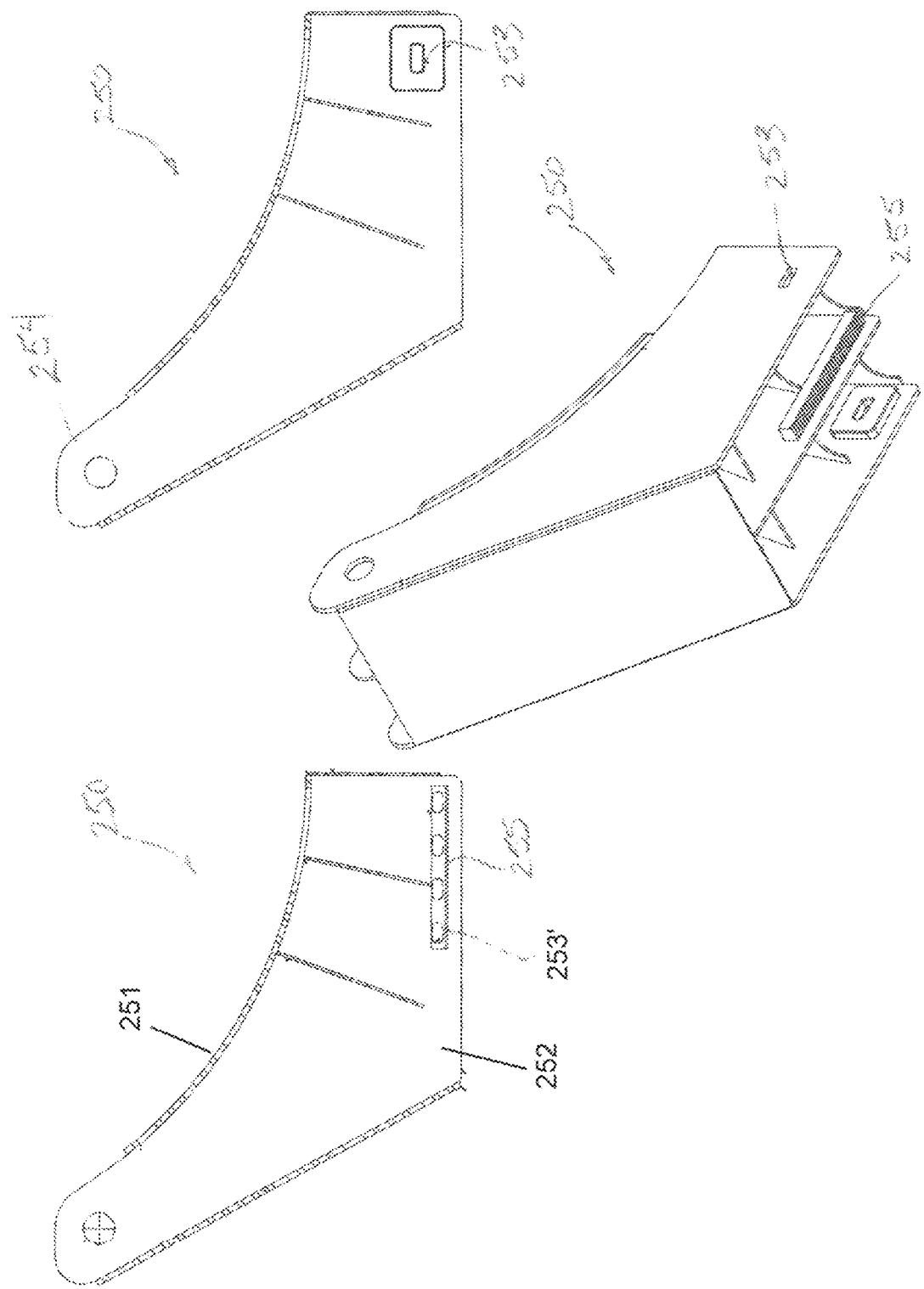

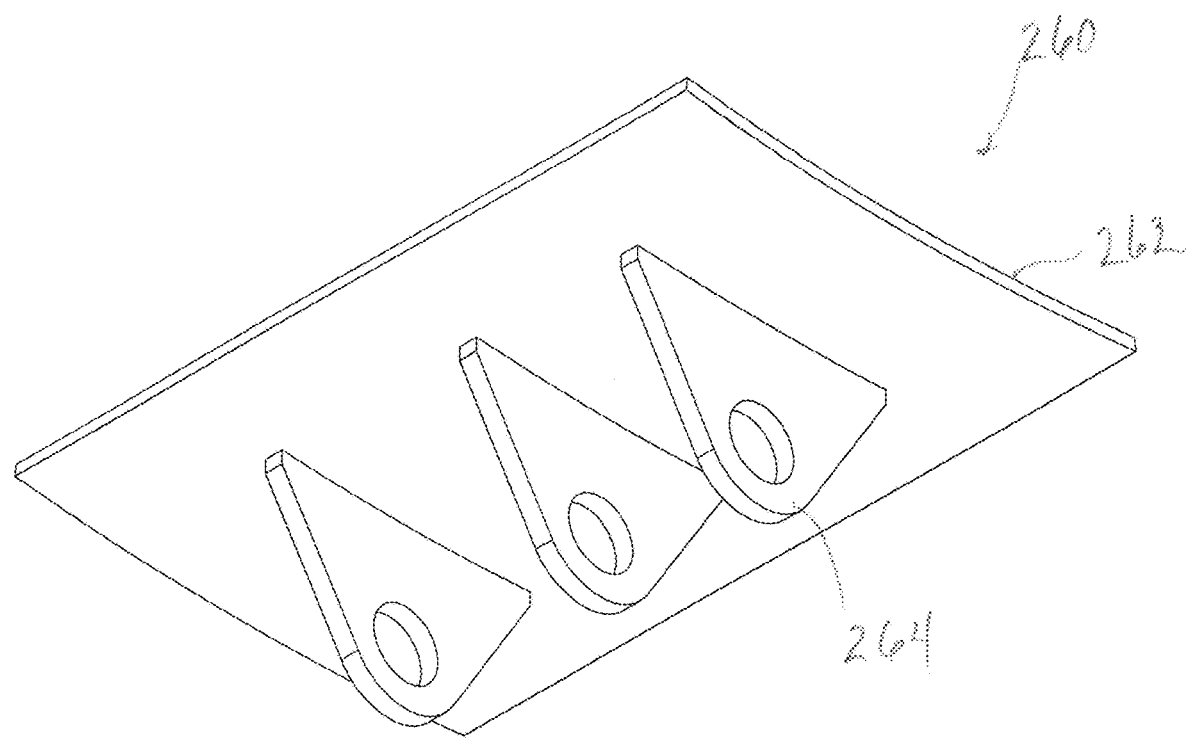
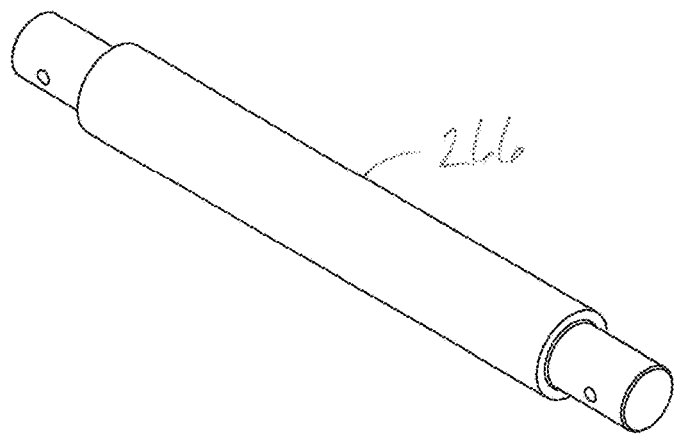
FIG. 9C

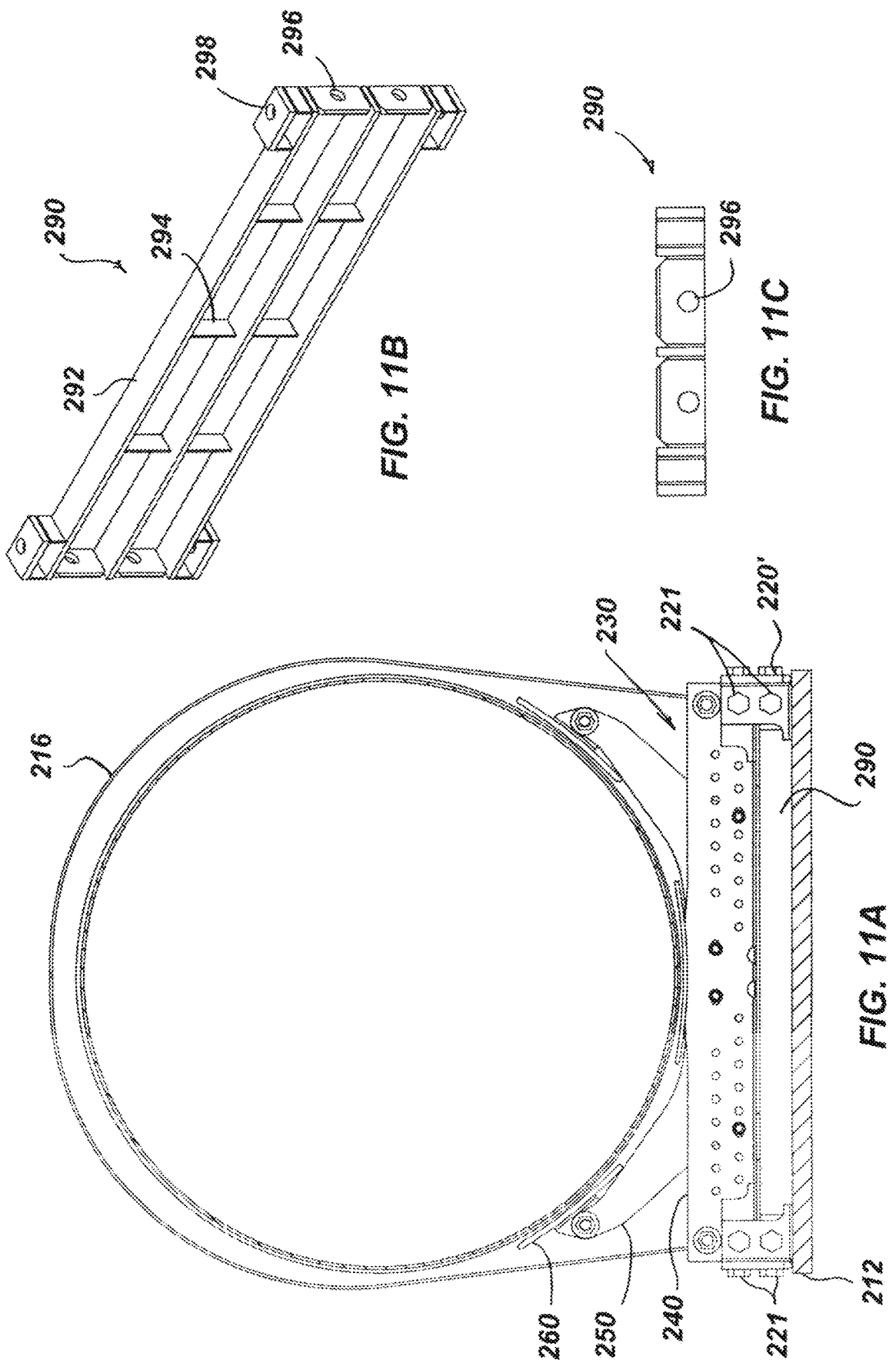

MODULAR SYSTEMS AND METHODS FOR TRANSPORTING TOWER ASSEMBLY OF WIND TURBINE

CROSS-REFERENCE TO RELATED APPLICATIONS

This application claims the benefit of U.S. Provisional Appl. No. 63/294,617 filed Dec. 29, 2021, which is incorporated herein by reference.

BACKGROUND OF THE DISCLOSURE

A wind turbine, such as a Horizontal Axis Wind Turbine, for generating electrical power has a tower that supports a nacelle at its top end. A rotor extends from the nacelle and has turbine blades. During operation, prevailing winds cause the turbine blades to rotate the rotor, which is coupled to a generator within the nacelle to produce electricity. To orient the blades, the nacelle can turn about the vertical axis of the tower.

The tower can be any acceptable height. However, the power generation capacity of a wind turbine is directly related to how long the turbine blades are. The length of the turbine blades in turn dictates the required height of the tower. In some large-scale installations, the blades can be about 45-meters long, and the tower can be as much as 90-meters high. Generally, the tower tapers from its base to its top end, which still provides the required strength but with reduced material and fabrication costs. Due to their overall height, the tower is manufactured and transported in a number of tower sections that assemble together at the installation site.

As will be appreciated, the different components of the wind turbine are separately manufactured, sometimes at different locations, and are then transported in pieces to the desired site where they are assembled. Because the components are manufactured in many different places, a number of various forms of transportation must be used, including ships, barges, trains, and trucks.

The sheer size of the various components complicates the transportation. Additionally, the components must be protected and handled properly during transportation to prevent damage. Moreover, the components in many cases must be switched from one mode of transport to another mode during stages of the journey. In the end, it will be appreciated that the logistics to move the various components from the point of manufacture to the ultimate installation site can be complicated, expensive, and time-consuming.

Each mode of transport presents challenges to transporting the tower sections. In particular, the profile for railroad transport can be tightly limited because the trains must traverse curved sections and complex rail yards. Mounting fixtures are used to fix the tower sections to railcars during transport.

A particular example of mounting fixtures for fixing tower sections is disclosed in U.S. Pat. No. 8,529,174. Although current techniques are available for transporting tower sections on a railcar, such as disclosed in U.S. Pat. No. 8,529,174, transportation personnel are continually seeking more versatile and useful ways to transport large cylindrical objects, such as tower sections of a wind turbine.

The subject matter of the present disclosure is directed to overcoming, or at least reducing the effects of, one or more of the problems set forth above.

SUMMARY OF THE DISCLOSURE

As disclosed herein, a support can be used for transporting a tower section of a wind turbine on a bed of a transport device. The tower section has: a longitudinal length between first and second ends, an outer surface, and a circumference. The support comprises a base, a pair of saddles, and a plurality of keys.

The base is configured to affix to the bed of the transport device. The base has opposing ends, lateral sidewalls, and first racks. The lateral sidewalls extend between the opposing ends and are disposed adjacent to one another with a space therebetween. The first racks are disposed in the space between the lateral sidewalls and extend in opposing lateral directions. Each of the lateral sidewalls defines a pair of first slots therein.

The pair of saddles are configured to position opposing one another in the space between the lateral sidewalls of the base. Each saddle has a top end, a bottom end, and two lateral sides. Each top end has a cradle surface pivotable about a pivot point, and each bottom end has a second rack configured to engage one of the first racks. Each of the lateral sides defines a second slot therein.

The keys are configured to position in the second slots in the lateral sides of the saddles aligned with the first slots in the lateral sidewalls of the base. The keys positioned in the first and second slots are configured to prevent vertical movement of the saddles from the bed, and the first and second racks engaged with one another are configured to prevent lateral movement of the saddles relative to the base.

The support can further comprise padding configured to position between the support and the circumference of the tower section.

The base can define openings configured to affix with fasteners to tabs of the bed supports. For example, side openings can be configured to affix with fasteners to sidewall tabs of the bed supports, and end openings can be configured to affix with fasteners to endwall tabs of the bed supports.

Each saddle can have a hinge as the pivot point, and each cradle surface can be connected to the hinge of the respective saddle.

Each saddle can define a first curvature configured to face the circumference, and each cradle surface can define a second curvature configured to face the circumference.

The base can comprise a pad disposed across the space between the lateral sidewalls and centrally located on the base.

The support can further comprise a lift configured to support the base at a height above the bed.

Each of the first slots in the base can be an elongated slot defined laterally in the respective lateral sidewall, and each of the second slots of the saddle can be an aperture defined in the respective lateral side. The aperture on the lateral side can be adjustably alignable with the elongated slot in the lateral sidewall adjacent thereto. The key can be configured to affix between the aperture aligned with the elongated slot.

Each of the keys can have a shoulder at one end and can have a pin hole at an opposite end. The shoulder can be configured to fit adjacent one of the lateral sidewalls or lateral sides, and the pin hole can be configured to receive a retaining pin.

The at least one support can comprise a lashing connected to the at least one support and configured to be lashed about the portion of the tower section.

As disclosed herein, a system can be used for transporting a tower section of a wind turbine. The tower section has a longitudinal length between first and second ends, has an outer surface, and has a circumference. The system comprises a transport device and at least one support as described above. The transport device has a bed, which has a bed length and has a plurality of support locations disposed thereon. The at least one support as described above is affixable on the bed at one of the support locations.

In the system, the at least one support can be at least one intermediate support affixable on the bed at at least one intermediate of the support locations on the bed. The system can further comprise first and second end supports being affixable respectively at first and second of the support locations on the bed. The first end support can comprise a flange affixable to the first end of the tower section, and the second end support can be affixable to the second end of the tower section. At least one of the first and second end supports can be longitudinally adjustable relative to the bed to accommodate the section length of the tower section.

In the system, the respective one of the first and second support locations for the at least one longitudinally adjustable end support can comprise a rail disposed longitudinally on the bed. The at least one adjustable end support can be adjustably affixable to the rail.

In the system, the at least one longitudinally adjustable end support can comprise the first end support having the flange affixable to the end of the tower section; the at least one longitudinally adjustable end support can comprise the second end support comprising at least one anchor affixable to the second end of the tower section and connected by at least one line affixable to the second support location on the bed; or the second end support can comprise a second flange affixable between the bed and the second end of the tower section. In the system, the at least one support can comprise a flange affixable to one of the first and second ends of the tower section.

In the system, each of the support locations can comprise one or more tabs disposed on the bed of the transport device and being configured to restrain the at least one intermediate support positionable thereon at least laterally and longitudinally on the bed. The at least one support can be affixable by fasteners to the one or more tabs disposed on the bed.

In the system, the transport device can be selected from the group consisting of a railroad car, a flatcar, a vessel, a ship, a tug, a barge, a truck, a trailer, a pallet, and a shipping container.

Also disclosed herein is a method of transporting a tower section of a wind turbine. The tower section has a longitudinal length and a circumference. The method comprises: positioning at least one support at at least one location on the bed of the transport device; adjusting a lateral separation between longitudinal pivots disposed on opposing saddles to accommodate the circumference of the tower section by positioning the opposing saddles in a lateral direction on the at least one support; preventing longitudinal movement of the opposing saddles by engaging lateral sides of the opposing saddles with lateral sidewalls of the at least one support; preventing lateral movement of the opposing saddles in the lateral direction by engaging first racks disposed on the opposing saddles with second racks disposed on the at least one support; preventing vertical movement of the opposing saddles in a vertical direction from the bed by engaging keys in slots aligned between the lateral sidewalls of the at least one support and the lateral sides of the opposing saddles; and loading the tower section on the transport device by supporting the circumference of the tower section on pivoting cradle surfaces pivotable about the longitudinal pivots on disposed on the opposing cradle saddles and allowing the pivoting cradle surfaces to pivot in a radial direction about the longitudinal pivots to accommodate the circumference of the tower section.

In the method, positioning the opposing saddles in the lateral direction on the at least one support can comprise positioning the opposing saddles in a space between the later sidewalls of the at least one support.

In the method, engaging the first racks disposed on the opposing saddles with the second racks disposed on the at least one support can comprise engaging teeth of the first racks disposed on bottom ends of the of the opposing saddles with teeth of the second racks disposed on a base of the at least one support.

In the method, engaging the keys in the slots aligned between the lateral sidewalls of the at least one support and the lateral sides of the opposing saddles can comprise extending each key through the slot in the lateral side aligned with a laterally elongated aperture for the slot in the lateral sidewall.

The foregoing summary is not intended to summarize each potential embodiment or every aspect of the present disclosure.

BRIEF DESCRIPTION OF THE DRAWINGS

FIGS. 2A-2B illustrate a side view and a plan view of one of the flatcars of the modular assembly.

FIG. 2C illustrates an isolated plan view of a bed support for the flatcar.

FIGS. 3A-3D illustrate a side view, a plan view, and opposing end views of another of the flatcars of the modular assembly.

FIGS. 4A-4C illustrate a side view, a plan view, and an end view of yet another of the flatcars of the modular assembly.

FIGS. 5A-5C illustrate a side view, a plan view, and an end view of an alternative of the flatcars of the modular assembly.

FIGS. 7A-7B illustrate end views of the cradle of the disclosed modular assembly in two adjusted states.

FIG. 9B illustrates cross-sectional and bottom perspective views of the disclosed saddle.

FIG. 9C illustrates a cradle surface and a hinge for the disclosed saddle.

FIGS. 11A-11C illustrate an elevation arrangement for the disclosed cradle.

DETAILED DESCRIPTION OF THE DISCLOSURE

The subject matter of the present disclosure relates to systems and methods for transporting cylindrical tower sections, such as used for commercial wind turbines, using one or more railcars or other transport devices. Systems and methods disclosed herein are taught in U.S. application Ser. No. 16/934,517, filed 21 Jul. 2020, which is a continuation of U.S. application Ser. No. 15/603,172, filed 23 May 2017, which is a continuation-in-part of U.S. application Ser. No. 15/057,765, filed 1 Mar. 2016, which claims the benefit of U.S. Provisional Appl. 62/261,183, filed 30 Nov. 2015, each of which are incorporated by reference.

Figure 1:
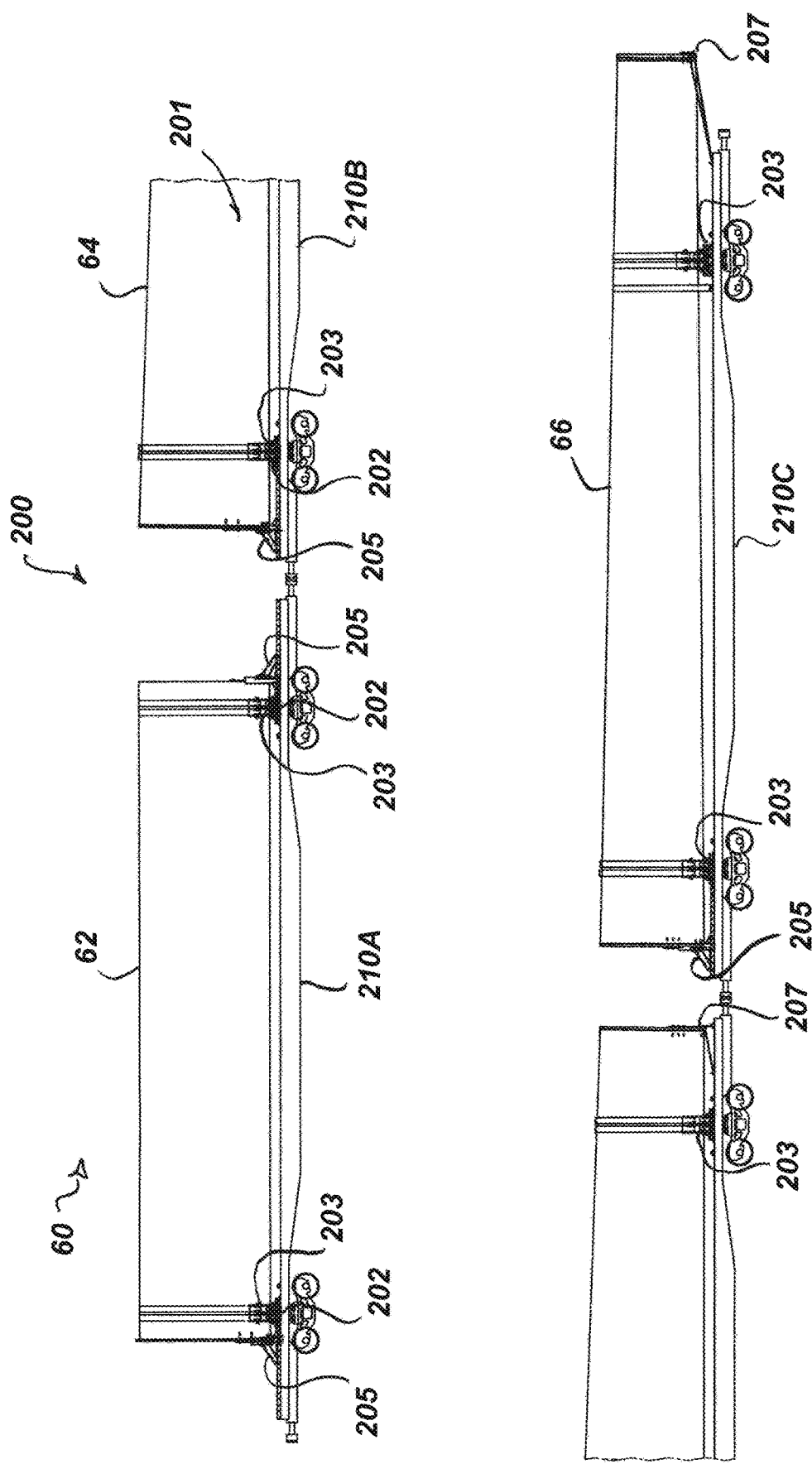
FIG. 1 illustrates a modular assembly according to the present disclosure transporting sections of a tower assembly.

FIG. 1 illustrates another example of a modular assembly 200 according to the present disclosure for transporting sections of a tower assembly 60. This modular assembly 200 is similar to that disclosed above so that reference to comparable components, functions, and features disclosed above are incorporated herein with respect to the present assembly 200.

Again, transport devices 210A-D transport cylindrical items, namely tower sections 62, 64, and 66 of the tower assembly 60 for a wind turbine. The tower sections 62, 64, and 66 represent a type of heavy-lift and over-dimension cargo, which requires significant coordination and time to transport. Other tower assemblies with other numbers of tower sections and lengths can readily be accommodated by the teachings of the present disclosure.

Again, the tower sections 62, 64, and 66 can be transported by rail so that the transport devices 210A-D can be railcars for transporting the tower assembly 60 by rail. The railcars include a first flatcar 210A supporting a lower tower section 62, a second flatcar 210B supporting an intermediate tower section 64, and a third flatcar 210C supporting a top tower section 66. As is typical, various ones of these tower sections 62, 66, and 64 may taper from its base end to its top end.

The base tower section 62 loaded onto the first flatcar 210A and the intermediate tower section 64 loaded on the second flatcar 210B do not take up the full length of the cars' beds 112. The upper tower section 66 may extend a length longer than the bed 212 of the third flatcar 210C. As will be appreciated, the tower assembly 60 may have more or less sections, and they can be arranged in a different order as the case may be. Likewise, more or less flatcars 210 can be used depending on the implementation.

Each of the flatcars 210A-C can accommodate at least one of the tower sections 62, 64, and 66 thereon using a plurality of supports 201 of the assembly 200. In general, the modular system 200 for transporting a tower section on the bed 121 of a transport device (i.e., flatcar 210) includes end supports 205, 207 and includes at least one intermediate support 203. The end supports 205, 207 generally include sleds, feet, and anchors, while the intermediate support 203 generally includes a cradle support. Each of the end supports 205, 207 are disposed on the bed 212 and are affixed to one end of the tower section. At least one of the end supports 205, 207 is longitudinally adjustable relative to the bed 212 to accommodate the varying longitudinal length of the given tower section. The at least one intermediate support 203 is disposed on the bed 212 and supports portion of the tower section. The at least one intermediate support 203 has a cradle being adjustable circumferentially against which the tower section rests. The adjustable cradle of the at least one intermediate support 203 allows it to accommodate the varying circumference of the given tower section.

On each flatcar 210 for each tower section, the supports 201 include a plurality of bed supports 202 affixable at support locations on the beds 212 of the flatcars 210. The at least one intermediate or cradle support 203 is engageable to the bed supports 202. In this way, the at least one cradle support 203 is positionable at one of the support locations in a modular fashion to support the tower sections 62, 64, and 66 on the beds 112 of the flatcars 210A-C.

As noted, the at least one cradle support 203 has an adjustable cradle against which the tower section 62, 64, and 66 rests. The adjustable cradle can be adjusted on each cradle support 203 between a plurality of circumferential dimensions, which can be set to the particular circumference of the tower section 62, 64, and 66 being supported.

On each flatcar 210 for each tower section, the supports 201 also include at least one foot end support 205 affixable to an end of the tower section supported on the bed 212 of the flatcar 210. For those tower sections that are too long, the supports 201 can include an anchor end support 207 affixable to another end of the tower section.

To discuss the various supports 201, support locations 202, cradle support 203, feet end supports 205, anchor end support 207, etc., reference is made to FIGS. 2A through 5C, which illustrate features on each of the flatcars 210A-C of FIG. 1. Turning first to FIGS. 2A-2C, a side view, a plan view, and an end view are illustrated of a first of the flatcars 210A of the present disclosure configured with components of the modular assembly 200 to support a tower section 62.

The flatcar 210 has a bed 212 supported with trucks 213 and having couplings 215. The bed 112 has a number of bed supports 202 at locations where the tower section can be supported on the bed 212. At least two support locations having the bed supports 202 are provided on the bed 212; however, preferably a number of support locations with bed supports 202 may be provided so various lengths of tower sections can be supported in different ways on the same flatcar 210A. Although not strictly necessary in all implementations, it may be preferred to locate one or more of the bed supports 202 over the rail trucks 213 so the weight of a supported load (i.e., tower section) may be more directly transferred to the underlying rails.

Two cradle supports 203 disposed on the bed supports 202 are used to support the tower section 62 near both ends, and straps 216 extending from sides of the cradle supports 203 wrap around portions of the tower section 62. The bed supports 202 include bed fixtures 220 for supporting the cradle supports 203. Opposing bed fixtures 220 at the edges of the bed 212 affix to the ends of the cradle support 203 to restrain it both laterally and longitudinally on the bed 212.

As shown in FIG. 2B, for example, ends of an adjustable cradle 230, which is discussed in more detail below, can fit in the opposing set of bed fixtures 220 on the bed 212. Preferably, at least one opposing set of bed fixtures 220 is affixed at each end of the bed 112, but more can be placed in intermediate locations between them to provide selective support locations. These low-profile bed fixtures 220 mounted on the bed 212 are preferred for transferring the weight of the tower section onto the flatcar's bed 212. (Depending on the weight of the transported item, however, it may be possible for one or more of the intermediate cradle supports 203 to be adjustably mounted on rails 206 in a manner similar to the end supports 205. Likewise, it may be possible for one of the end supports 205 adjustably mounted on the rails 206 to also include cradle surfaces similar to those disclosed herein.)

As shown in the detail of FIG. 2C, the bed fixture 220 has tabs or clips 222, 224 affixed toward the edge of the flatcar's bed 112. A sidewall tab 222 is disposed on the bed's edge and has openings 226 for affixing to the end of the cradle support 203 with bolts or other fasteners. Endwall tabs 224 extend orthogonally from the sidewall tab 222 and have openings 228 for affixing to the end of the cradle support 203 with bolts or other fasteners. The sidewall and endwall tabs 222, 224 create a slot or pocket in which the end of the cradle support 203 positions. In general, the tabs 220, 224 can be welded, bolted, or otherwise permanently affixed to the bed 112, or they can be affixed to a base plate (not shown) that in turn is affixed to the bed 112.

Elsewhere on the bed 212, the bed supports 202 can include eyelet loops 214 or similar lashing features affixed to the bed 212 adjacent the bed fixtures 220. Straps or tie downs (not shown) can be used with these eyelet loops 214 to lash the tower section 62 on the cradles 230. The cradles 230 also include features for straps or tie downs 216 to lash the tower section 62 on the cradles 230.

This tower section 62 has a length that allows it to fit on the bed 212 of the flatcar 210A. Accordingly, the supports include feet end supports 205 at opposing ends of the tower section 62 to restrain the section 62. The bed supports 202 for these opposing feet end supports 205 include rails 206 disposed at each end of the bed 212 for adjustably affixing to the feet end supports 205, which are discussed in more detail below. The rails 206 can be welded, bolted, or otherwise affixed to the bed 212. To accommodate the various lengths of the tower section, the position of the foot end support 205 on the rails 206 can be adjusted, and the foot end support 205 can be affixed in place with bolts or other fasteners. For their part, the feet end supports 205 can affix directly with bolts or the like to ends of the tower section 62, which typically already have a bolting arrangement used for assembly of the tower.

The flatcar 210 can be prepared ahead of time and can be reused as necessary. In one embodiment, the flatcar 210 can be a four axle, 89-ft. flat deck railcar. As configured, the flatcar 210 has all the prepositioned support locations 202 to allow the cradle supports 203 and the feet end supports 205 to be moved based on varying lengths of tower sections. In this way, a given tower section sits in the cradle supports 203 and affixes to the feet end supports 205, which can be adjusted for varying diameter sections. The cradle supports 203 can be moved to any of the pre-set bed fixtures 202, and the feet end supports 205 can be adjusted along the rails 206 to accommodate various diameters and lengths of tower sections.

FIGS. 3A-3D illustrate a side view, a plan view, and opposing end views of another flatcar 210B of the modular assembly 200. As opposed to the previous example, the tower section 64 here is nearly as long as the bed 212. Therefore, a cradle support 203 and a foot end support 205 support one end of the tower section 64, while a cradle support 203 and an anchor end support 207 support the other end of the tower section 61. In fact, the bed 212 at this other end may or may not include rails (206) for a foot end support (205), although it could.

FIG. 3C shows the end of the tower section 64 supported by the foot end support 205 affixed to the rails 206. Side lines 208 can affix from the bed 212 to anchors 209 attached to the edge of the tower section 64. By contrast, FIG. 3D shows the other end of the tower section 64 supported by the anchor arrangement end support 207. Here, side lines 208 affix from the bed 212 to anchors 209 attached to the edge on opposite sides of the tower section 64. More centrally located to prevent longitudinal movement, centralized lines 208' can affix from the bed 212 to a centralized anchor 209' attached to the bottom of the edge of the tower section 64. As shown, the anchor end support 207 can use side lines 208 in the form of straps, cable, cord, rope, etc. and can attach the side lines 208 to plates as the anchors 209 bolted to the bolting arrangement on the tower section's ends.

FIGS. 4A-4C illustrate a side view, a plan view, and an end view of the other flatcar 210C of the modular assembly 200. As opposed to the previous examples, the tower section 66 here is longer than the bed 212. Therefore, a cradle support 203 and a foot end support 205 support one end of the tower section 66, while a cradle support 203 and an anchor end support 207 support the other end of the tower section 66. In fact, the bed 22 at this other end may or may not include rails 206 for a foot end support 205, although it could.

Overall, the foot end support 205 and anchor end support 207 for this longer tower section can be similar to that discussed previously. In some differences, additional lashing 218 can be used to support the tower section 66, especially at its tapered end. Additionally, the cradle support 203 at the tapered end may be elevated or higher to account for the smaller diameter of the section 66 at this tapered end. Further details of an elevated cradle support 203 are discussed later.

FIGS. 5A-5C illustrate a side view, a plan view, and a cross-sectional end view of an alternative flatcar 210C of the modular assembly 200. Again, the tower section 66 here is longer than the bed 202. Therefore, a cradle support 203 and a foot end support 205' support one end of the tower section 66, while a cradle support 203 and an anchor end support 207 support the other end of the tower section 66.

As shown here, the foot end support 205' is not adjustable on rails as in previous arrangements. Instead, the foot end support 205' is directly affixed at a support location to the bed 212. In general, the fixed foot 280 can be similar to what is disclosed previously with reference to FIGS. 9A-9B. The fixed foot 280 has a base 282 that affixes to the bed 212 of the flatcar 210. A flange 286 extends from the base 280 and has slots 288 for attaching by bolts and the like to the bolting arrangement on the end of the tower section in a manner similar to the foot discuss previously. The fixed foot 280 can also have pivotable cradle surfaces 284 on which the end of the tower section can rest.

As this example indicates, any one or more of the given feet end supports 205' used on the flatcars 210 can have a fixed position, while any foot end support 205 for the other end can be used adjustable on rails 206 (or an anchor end support 205 for the other end can be used for adjustment instead).

Figure 6A:
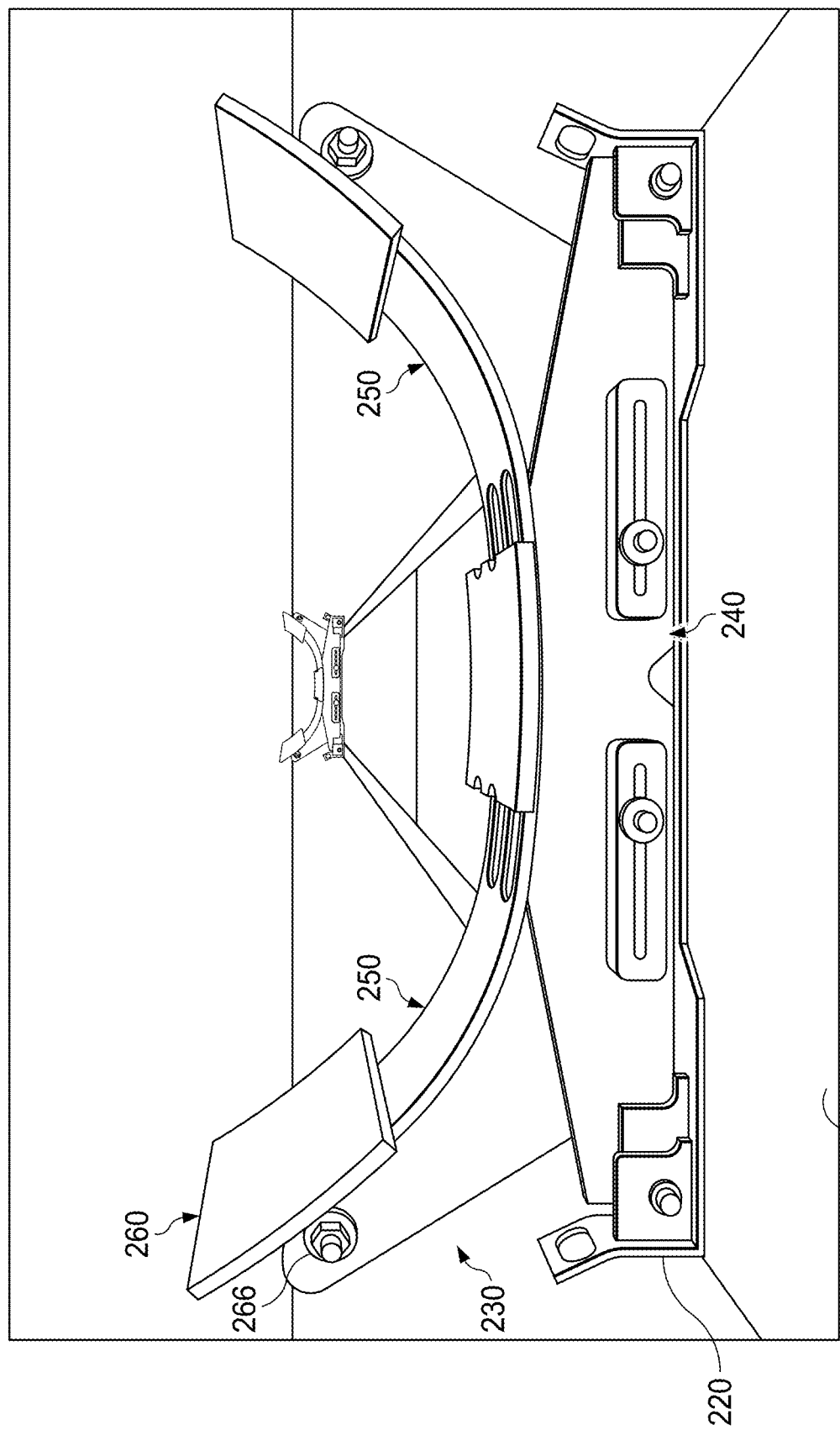
FIGS. 6A-6B illustrate a side view and a perspective view of a cradle of the disclosed modular assembly.
Figure 6B:
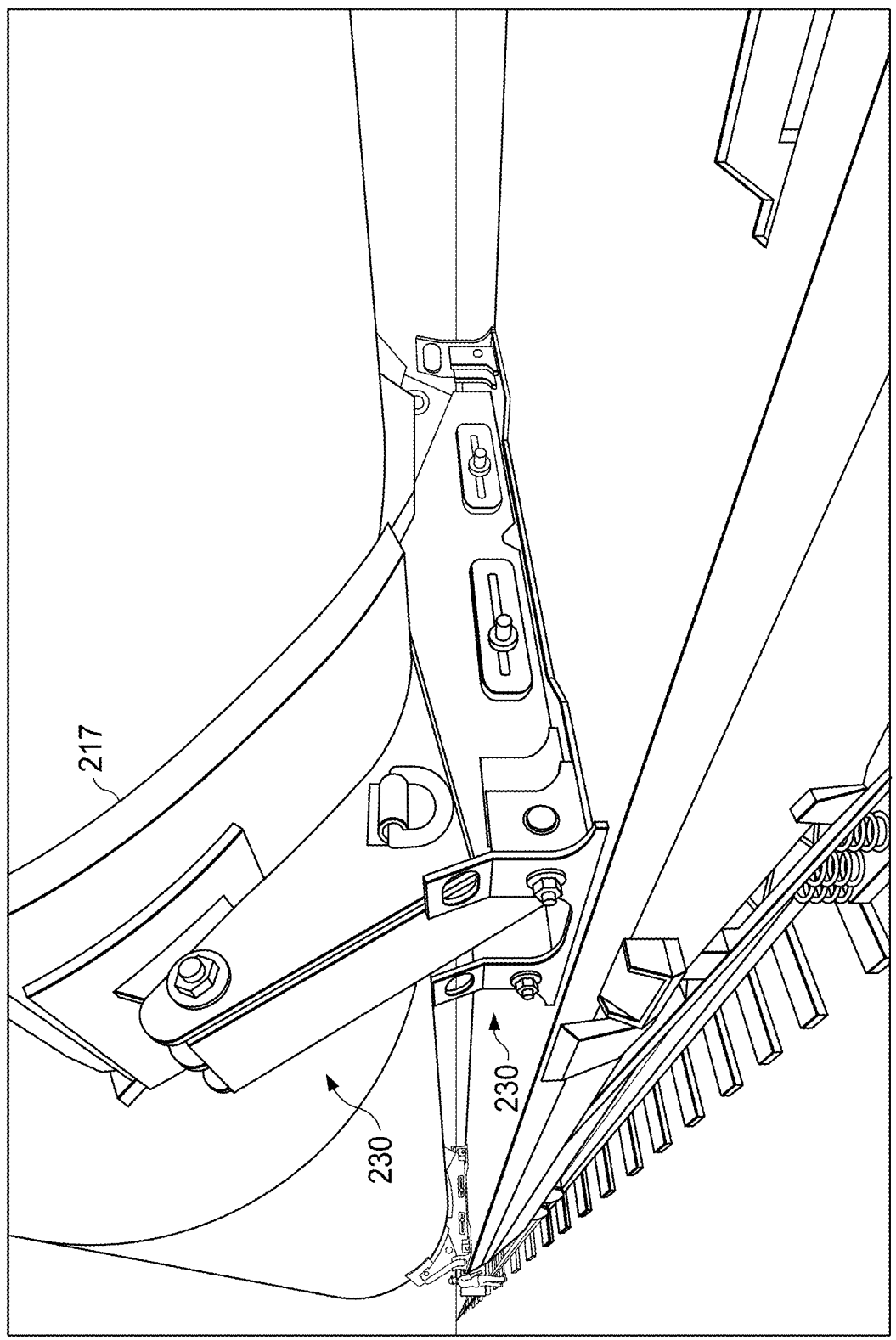

Having an understanding of the various supports 202 and other features of the flatcars 210, discussion now turns to particulars of several of these components. Looking now at the adjustable cradle 230, FIGS. 6A-6B illustrate side and perspective views of an adjustable cradle 230 of the disclosed modular assembly.

Figure 8A:
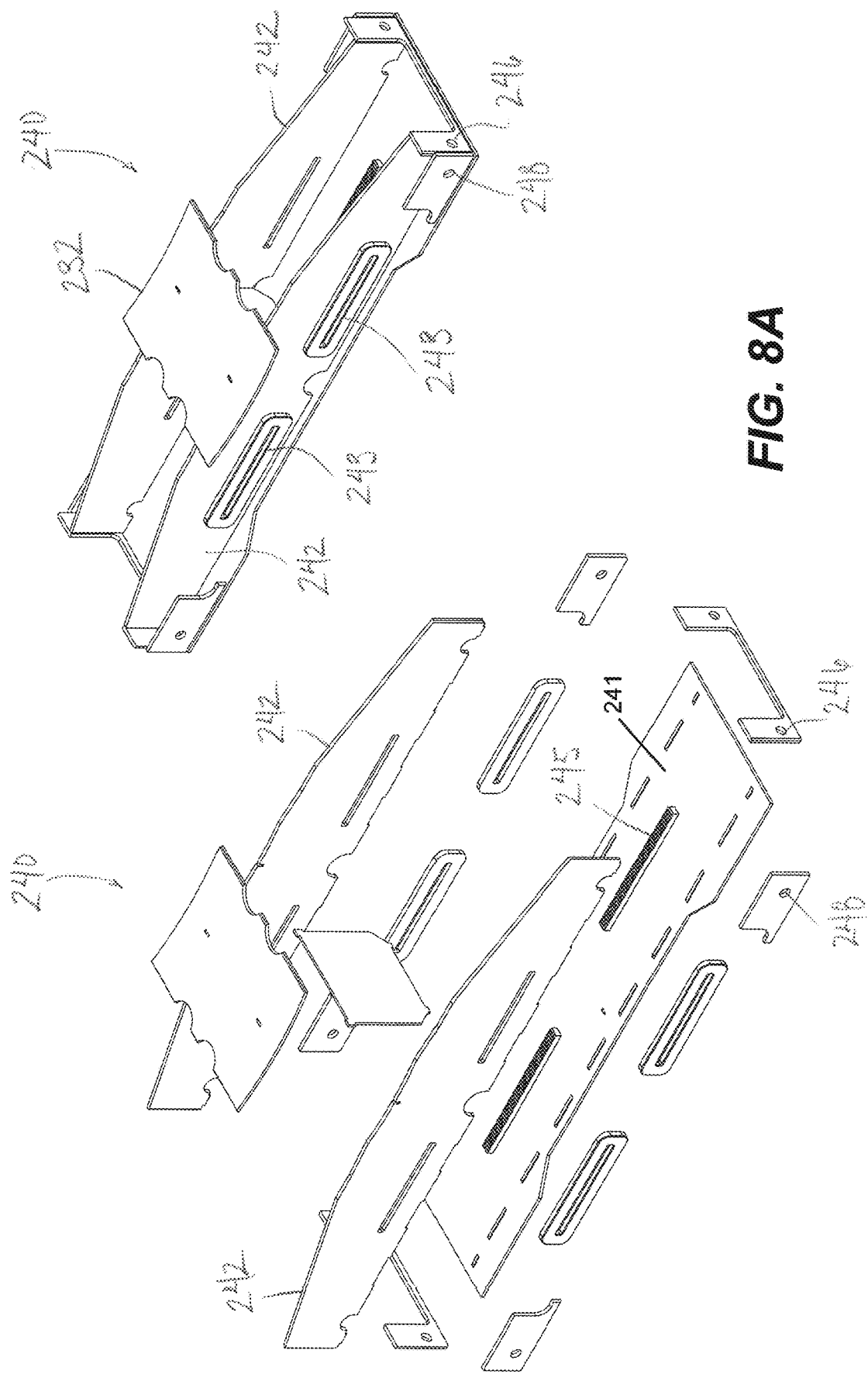
FIG. 8A illustrates exploded and perspective views of a base of the disclosed cradle.
Figure 8B:
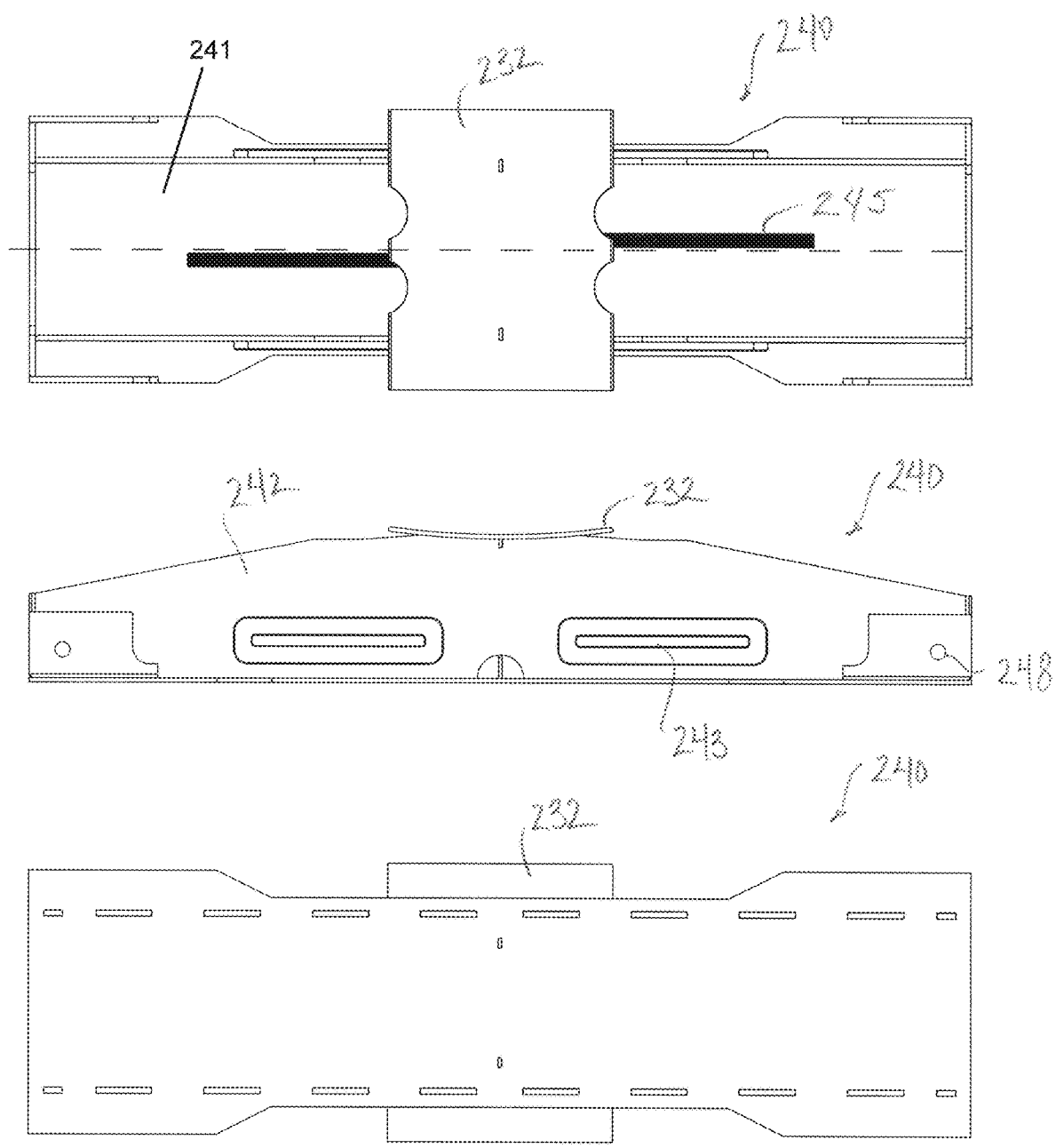
FIG. 8B illustrates top, side, and bottom views of the disclosed base.

The adjustable cradle 230 includes a base 240, saddles 250, and cradle surfaces 260. In general, the base 240 sets on the bed (212) of the flatcar and affixes to bed supports 220 on the bed 212. Opposing ends of the base 240 affix to the sidewall tabs of the bed supports 220 to hold the cradle 230 in place. In particular, sidewalls on the base 240 have side fastener openings (248: FIGS. 8A-8B) to receive bolts to affix to the sidewall tabs of the bed supports 220, and endwalls on the base 240 have endwall fastener openings (246: FIGS. 8A-8B) to receive bolts to affix to the endwall tabs of the bed supports 220.

The cradle 230 has a hinge (266: FIG. 9C) that positions adjacent the bed (212) of the flatcar (210) and supports an end of the cradle surface 260 of the adjustable cradle 230. Additionally, the saddle 250 is positioned on the base 240 between the bed (212) and the cradle surface 260 and is adjustable relative to the hinge 266 to adjust an angle of the cradle surface 260 relatives to the bed (212). The hinge and saddle arrangement are mirrored on an opposing end of the cradle 230 so that an opposing angle of another cradle surface 260 can be adjusted relative to the bed (212) in a comparable manner.

In use, the adjustable cradle or support 230 can accommodate any difference in a circumference of a tower section along the tower's longitudinal length by providing adjustable lateral separation between longitudinal pivots 266 disposed on opposing cradle saddles 250. The opposing cradle saddles 250 are moveable in a lateral direction on the base 240 of the adjustable cradle or support 230. As shown in FIG. 6B, the tower section loaded on the transport device has its circumference supported on pivoting cradle surfaces 260 that are pivotable about the longitudinal pivots 266 disposed on the opposing cradle saddles 250. In this way, any difference in the circumference of the tower section along its longitudinal length can be further accommodated by allowing the pivoting cradle surfaces 260 to pivot in a radial direction about the longitudinal pivots 266. As shown in FIG. 6B, padding, cushioning, or the like 217 can be placed between the cradle or support 230 and the tower section.

Figure 8C:
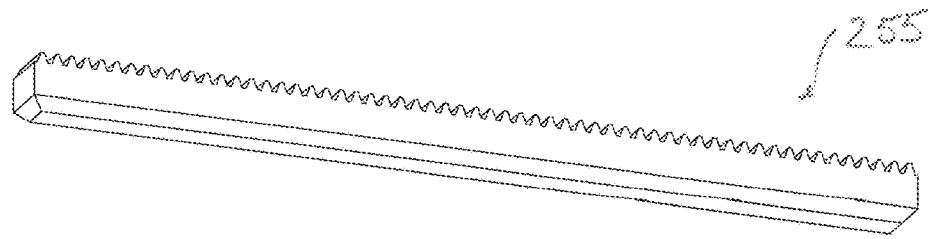
FIG. 8C illustrates a perspective view of a tooth set for the disclosed base.

Looking at the base 240 in more detail, FIG. 8A illustrates exploded and perspective views of the base 240, and FIG. 8B illustrates top, side, and bottom views of the disclosed base 240. FIG. 8C illustrates a perspective view of a tooth set 245 for the disclosed base 240.

Figure 9A:
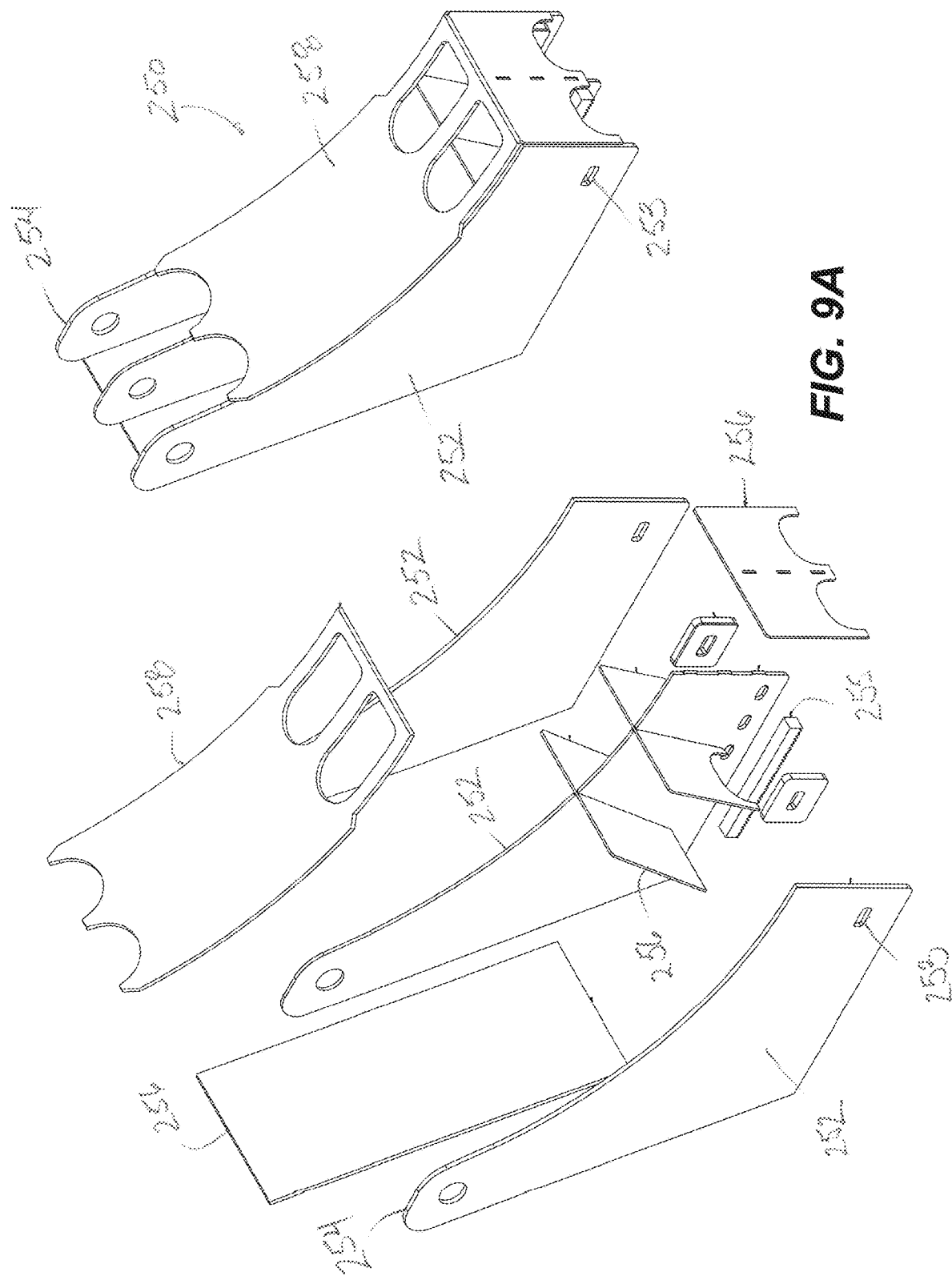
FIG. 9A illustrates exploded and perspective views of a saddle of the disclosed cradle.
Figure 9D:
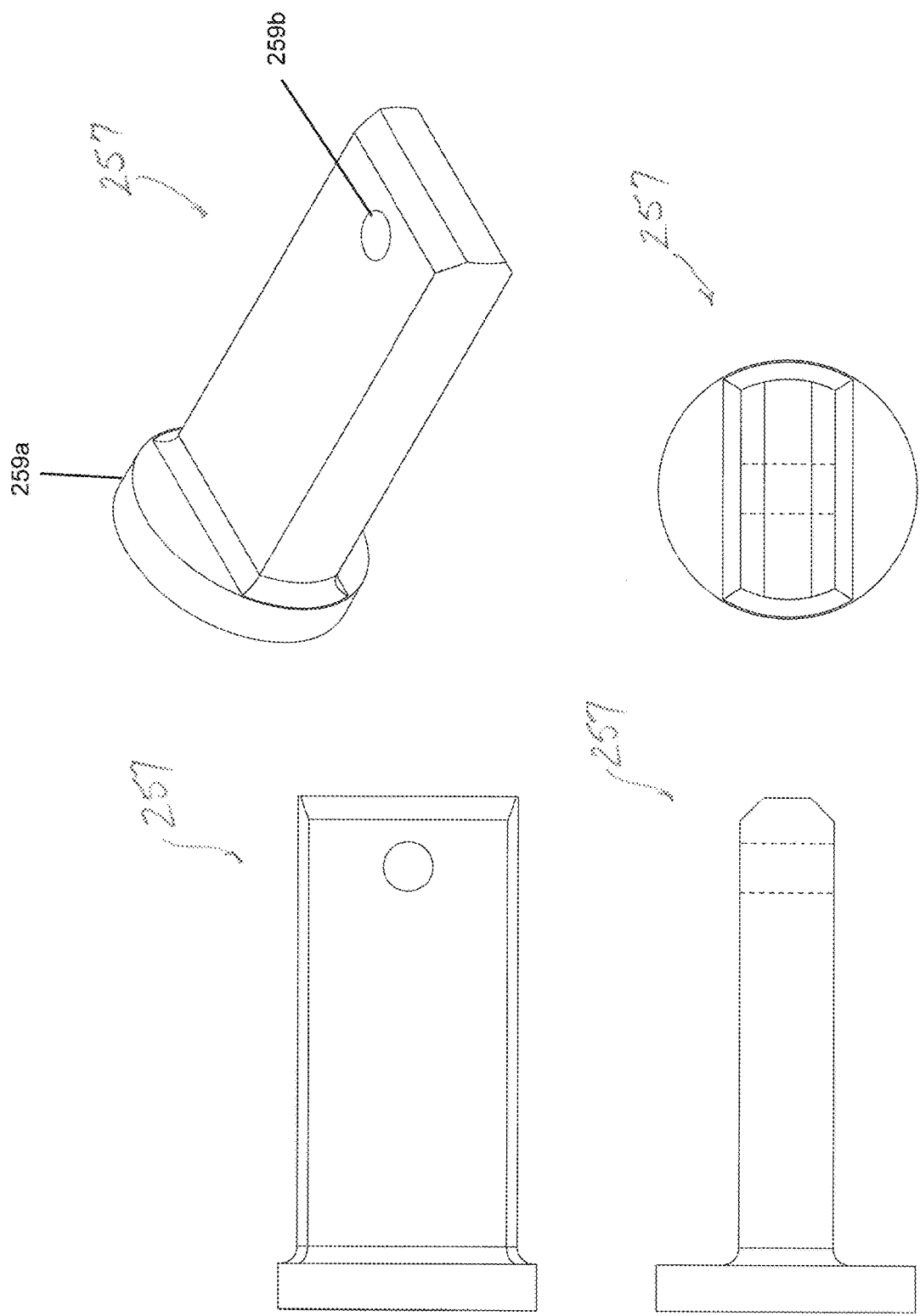
FIG. 9D illustrates top, side, perspective, and end views of a tab for the disclosed saddle.
Figure 9E:
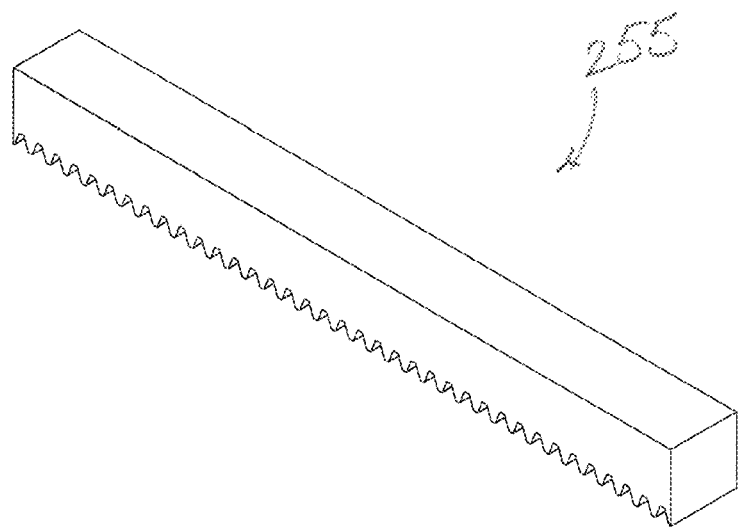
FIG. 9E illustrates a perspective view of a rack for the disclosed saddle.
Figure 10D:
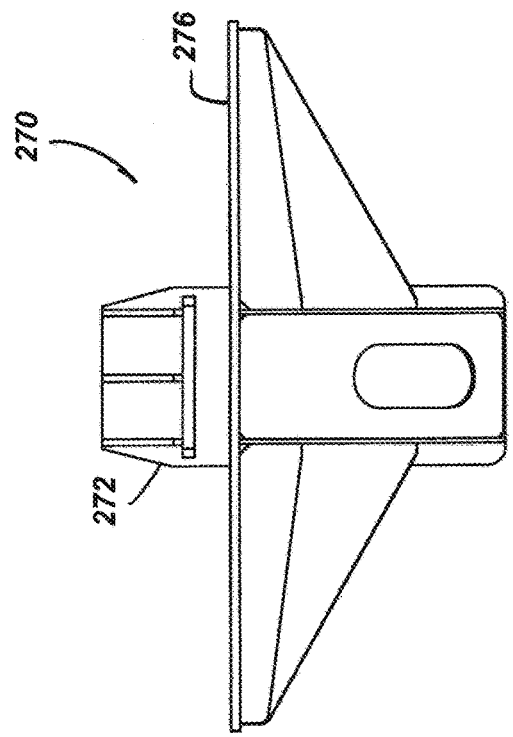
FIGS. 10A-10D illustrate a perspective view, a front view, a side view, and a plan view of an adjustable foot of the disclosed assembly.
Figure 10C:
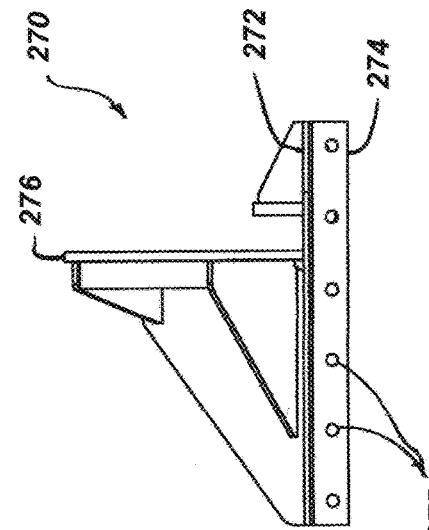
Figure 10A:
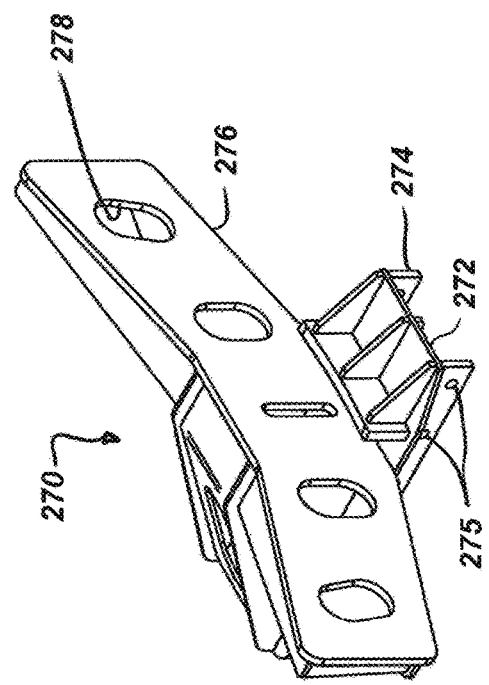
Figure 10B:
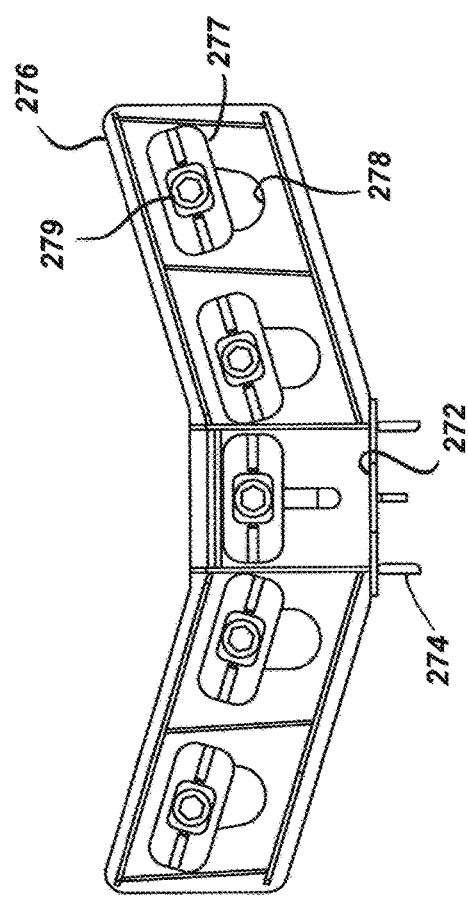

Looking at the saddle 250 in more detail, FIG. 9A illustrates exploded and perspective views of the disclosed saddle 250, and FIG. 9B illustrates cross-sectional and bottom perspective views of the disclosed saddle 250. FIG. 9C illustrates a pad 260 and a hinge 266 for the disclosed saddle 250, and FIG. 9D illustrates top, side, perspective, and end views of a tab 257 for the disclosed saddle 250.

As shown, the base 240 has a base plate 241 having at least two struts or lateral sidewalls 242 running along its length from end to end. Here, two or lateral sidewalls struts 242 are shown, but more could be used. Along both ends, each of the struts 242 has fastener openings or elongated slots 243 to receive tabs or bolts (257: FIG. 9D) to affix the saddles 250 at least vertically in place on the base 240.

Figure 7C:
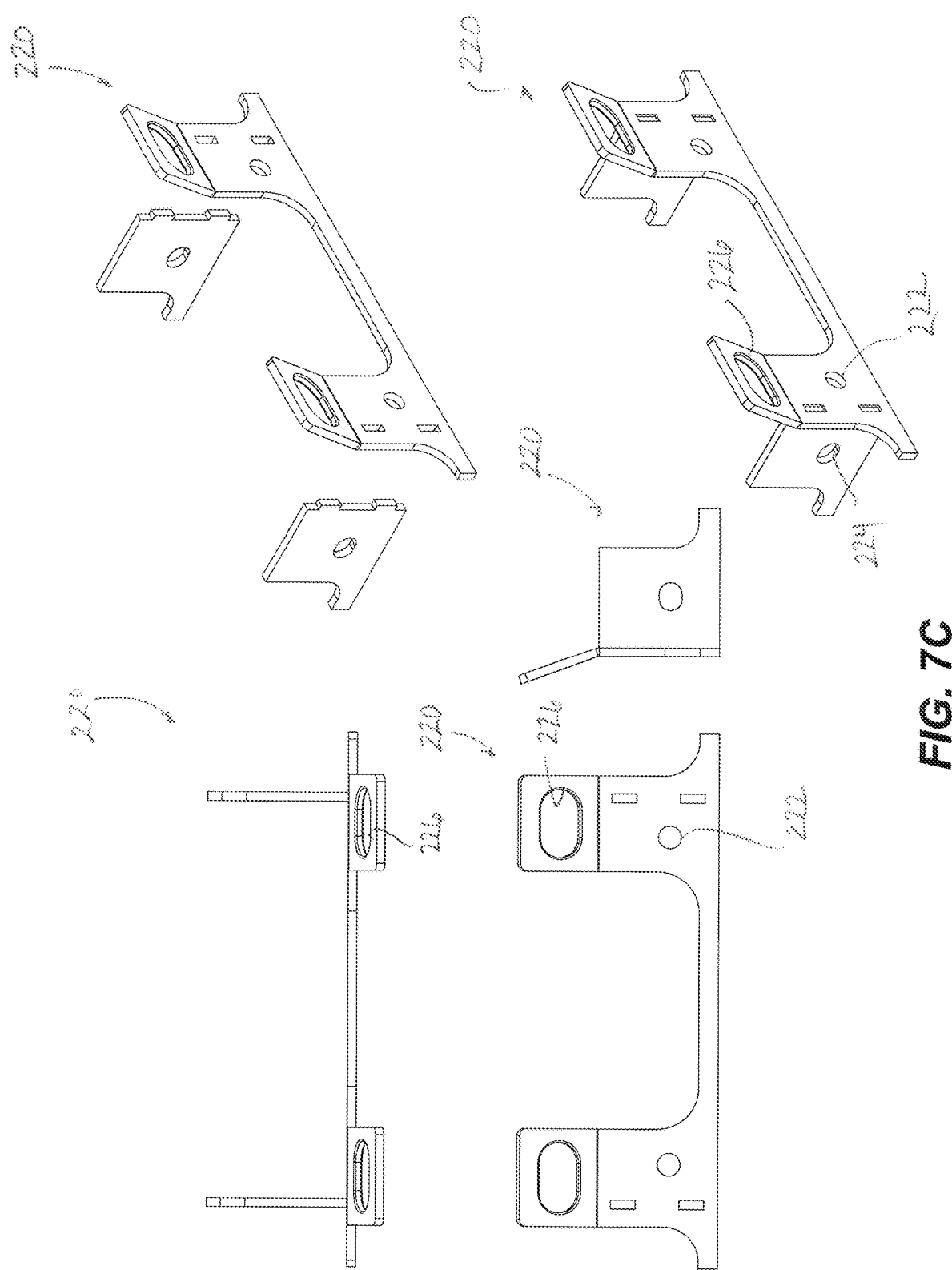
FIG. 7C illustrates top, end, side, exploded, and perspective views of a bed support for the disclosed cradle.

The saddles 250 positioned on opposing ends of the base 240 hold up the cradle surfaces 260 pivoted on the hinges 266. The saddles 250 can adjustably positioned on the base 240 along the length of the struts 242, aligning slots/holes in the saddles 250 with the fastener openings 243 in the struts 242 to receive tabs/bolts (257: FIG. 9D). (As noted, other arrangements using tabs, slots, pins, bolts, openings, and the like can be used to adjustably position the saddle 250 on the base 240.) The saddles 250 having the cradle surfaces 260 attached with the hinges 266 to the upper ends of the saddles 250 allow the surfaces 260 to pivotably adjust to the outer dimension of the tower section. In this way, the opposing saddles 250 facing inward toward a central pad 232 on the base 240 can adjust the dimension, circumference, and the like of the cradle surfaces 260 for supporting a tower section. (For comparison, FIGS. 7A-7B illustrate end views of the cradle 230 of the disclosed modular assembly 200 with the saddles 250 in two adjusted states to accommodate tower sections 61A-B having different diameters.) Briefly, FIG. 7C illustrates various views of a bed support 220 for the disclosed cradle. At the ends, the bed support 220 has bolt holes 222 to attach with bolts to bolt holes 246 on end of the base 240, and the bed support has bolt holes 224 to attach with bolts to bolt holes 246 on the side of the base 240. Additionally, the bed support 220 has lashing openings 226 to provide attachment points for any lashing to be used.

In arrangements disclosed herein, protruding tabs on the bottom of the saddles 250 can install in slots in the base (240). Also, spacer elements (not shown) could fit in the space between the cradle's endwalls and the saddles 250 to prevent movement of the saddles 250 outward as the cradle surfaces 260 hold the weight of the supported tower section. Such spacer elements can be used in combination with (or instead of) the bolts, pins, or the like and the strut openings 243 shown here. As disclosed herein, the spacer elements can include bars, plates, blocks, or the like of configured lengths to fit the adjusted positions of the saddles 250 on the base 240. As shown here, racks 245, which can have the form of tooth sets, ratchets, and the like, affixed on baseplate 241 of the base 240 can be used to engage and lock against corresponding racks, tooth sets or the like (255: FIGS. 9A-9E) affixed on the saddles 250 to prevent movement of the saddles 250 laterally toward and away from one another on the base 240. The tabs or keys 257 engaged in the slots 243, 253 on the base 240 and saddles 250 prevent the saddles 250 from lifting out of the base 240.

FIGS. 9A-9E illustrate various views of components for the saddle 250 of the disclosed cradle (230). The saddle 250 has adjacent members 252 that set in the base (240) between the struts (242). Each of the adjacent members 252 are comprised of adjacent plates interconnected to one another by cross pieces 256. Each of the members 252 has bearing surfaces or ends 254 at the top against which the cradle surface 260 rests. On its underside, the cradle surface 260 has trusses 264 that align with pivot openings on the saddle's bearing ends 254 for insertion of the hinge 266 about which the cradle surface 260 can pivot. On its exposed side, the cradle surface 260 can have a pad 262 of protective material, such as rubber, neoprene, or the like, against which the surface of the tower section rests.

As shown in the cross-section of the saddle 250 in FIG. 9B, the rack 255 can be welded to an intermediate member 252 of the saddle 250, and a series of holes 253' in the member 252 can facilitate the welded attachment. Other techniques can be used to attach rack 255 to the saddle 250.

As shown in FIGS. 9A-9B, each saddle 250 defines a first curvature 251 configured to face the circumference of the tower section. Meanwhile, as shown in other Figures, each cradle surface 262 also defines a curvature configured to face the circumference of the tower section.

As noted, the base (240) and the saddle 250 can have slots or fastener openings 253 to receive bolts, tabs (257) or the like to hold the saddle 250 in position on the base (240). For that purpose, the saddle 250 has a number of fastener openings 253 defined in the plates of the saddle 250 to adjustably align with the slots (243) in the base (240). Opposing opening 253 are used on both sides of the saddle 250 to allow for a number of alignable arrangements of the saddle 250 to the elongated slots (243) of the base (240).

As noted above and as shown here, each saddle 250 has a tooth set 245 affixed thereon that can be used to engage and lock against a corresponding tooth sets (245: FIGS. 8A-8C) on the base 240 to prevent movement of the saddles 250 toward and away from one another on the base 240. As also noted, the tabs or keys 257 engaged in the slots 243, 253 on the base 240 and the saddles 250 prevent the saddles 250 from lifting out of the base 240.

As shown in FIG. 9D, the tabs or keys 257 are generally flat to fit in the slots 243, 253. The tabs 257 have a shoulder 259a at one end and define a pin hole 259b at the opposite end. When disposed in the aligned slots 243, 253, the shoulder 259a engages against the inside surface of the sides 252 on the saddle 250, while the pin hole 259b in the opposite end of the tab 257 is disposed adjacent the lateral sidewall 242 of the base 240 and receives a pin, such as a cotter pin or the like. This is visible in FIGS. 6A-6B. A reverse arrangement could also be used.

FIGS. 10A-10D illustrates a perspective view, a front view, a side view, and a plan view of an adjustable foot end support 270 of the disclosed assembly. A base 272 of the foot end support 270 has tracks 274 with holes 275 along their length to affix to the rails (206) on the bed (212) of the flatcar (210). A flange 276 extending from the base 272 has a number of slots 278 for affixing with bolts to the bolt holes arranged on the end of a tower section (not shown). The size and placement of the slots 278 allow for the flange 276 to affix to different sized tower sections. To accommodate varying bolt hole positions in the tower section (not shown), for example, the flange 276 can have four slots 278 that allow bolts 279 to run through the bolt holes (not shown) in the tower sections. Load bearing plates 277 can be used with the bolts 279 on both sides of the flange 276 to adapt the fixture between the slots 278 and the bolt holes (not shown) on the end of the tower section.

Bolting to the flange 276 is used to restrain primarily the longitudinal load, but also to a lesser extent the lateral and vertical loads. In one example, the end of the tower section secures to the flange 276 with four grade "8" tool steel bolts 279 that are prevented from backing out using grade "8" tool steel sheer plates 277. To increase the restraint, the tower section can be strapped down as noted. The combination of adjustable cradle 230 and the different bolt securement positions of the foot end support 270 enables the foot end support 270 to handle a number of tower diameters, tower lengths, bolt-hole sizes, and bolt-hole arrangements.

As noted, some tower sections may taper so that a cradle support 203 on one of the ends may be elevated. FIGS. 11A-11C illustrate an elevation arrangement for the disclosed cradle. A pad 290 composed of struts 292 and cross-braces 294 has end and side openings 296, 298 for affixing with bolts 221 to the tabs of the support locations 220. As shown in FIG. 30A, the base 240 of the cradle 230 rests on the pad 290 so that the cradle surfaces 260, the saddles 250, and the like can be elevated a height off of the bed 212. The tabs of the support locations 220' can be increased in height to accommodate the combined thickness of the pad 290 and the base 240 and to accept two sets of bolts 221.

As disclosed herein, the module system 200 for transporting a tower section of a wind turbine includes a transport device, end supports, and at least one intermediate support. In previous examples, the transport device 210A of FIG. 2A included two intermediate supports 203 and two adjustable end supports 205; the transport device 210B of FIG. 3A included two intermediate supports 203 and two adjustable end supports 205, 207; the transport device 210C of FIG. 4A included two intermediate supports 203 and two adjustable end supports 205, 207; and the transport device 210C of FIG. 4A included two intermediate supports 203, one fixed end support 205', and one adjustable end supports 207. These configurations may be best suited for supporting cylindrical items such as the tower sections noted herein based on the weight and size of the tower sections and the flatcars of the transport devices 210.

Other configurations are possible depending on the type, size, weight, etc. of cylindrical item to be transported and depending on the type, size, etc. of the transport device 210 to be used. To that end, FIGS. 12A-12E show a number of other possible configurations. Each of these configurations include a transport device 210 that may include a flatcar, although other devices could be used. Each of the configurations is used for transporting a cylindrical item 61, such as a tower section or the like.

Figure 12A:
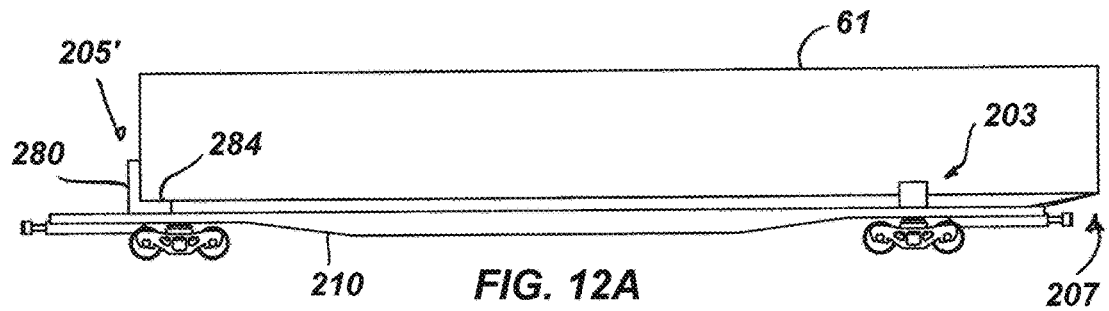
FIGS. 12A-12E show a number of other configurations for the disclosed modular assembly.
Figure 12B:
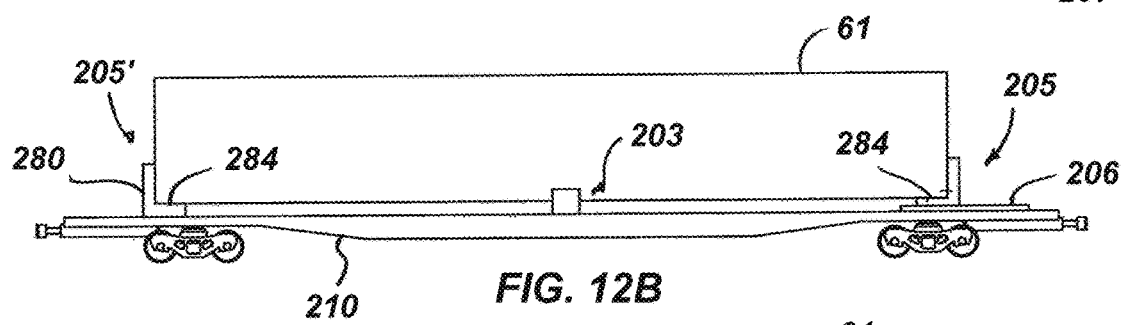
Figure 12C:
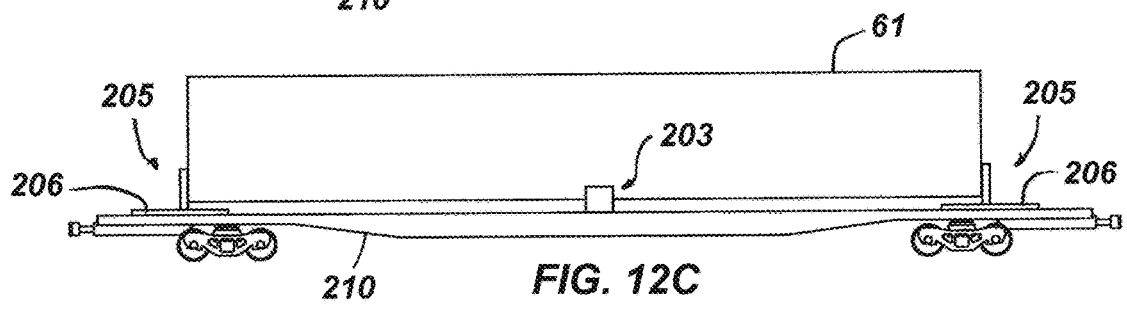
Figure 12D:
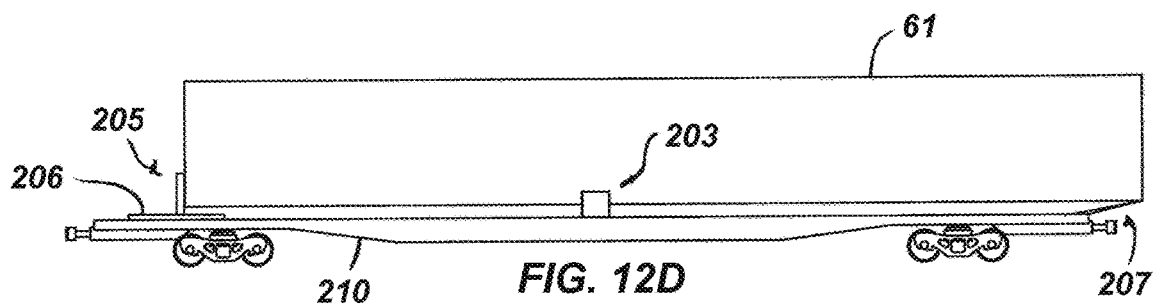
Figure 12E:
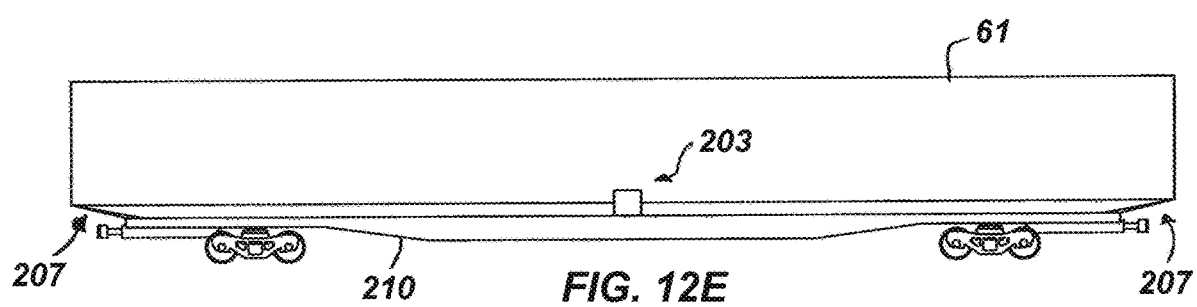

In FIG. 12A, the transport device 210 includes at least one intermediate support 203, one fixed end support 205' (e.g., fixed flange 280 with adjustable cradle surfaces 284), and one adjustable end support 207 (e.g., anchor support). In FIG. 12B, the transport device 210 includes at least one intermediate support 203, one fixed end support 205' (e.g., fixed flange 280 with adjustable cradle surfaces 284), and one adjustable end support (e.g., flange 205 having adjustable cradle surfaces 284 and movable on rail 206). In FIGS. 12C-12D, the transport devices 210 include at least one intermediate support 203 and two adjustable end support 205 and/or 207. These and other configurations are possible depending on the implementation.

The teachings of the present disclosure facilitate the transportation of large towers and tower sections used in conjunction with wind turbines. The term "tower," "tower section," and the like may be generally interchangeable in the present disclosure.

The modular system 100 uses mounting fixtures that include supports 101/201, intermediate supports 103/203, adjustable cradles 130/230, end supports 205/205'/207, feet 130'/270/280, bed supports and preconfigured support locations 102/120/120'/202/206/214/220 that can accommodate various tower dimensions and arrangements. The cradles 130/230, feet 130'/270/280, and the like can be reusable on the same or other transport devices or railcars to transport other tower sections or the like. The reusable cradles 130/230 and feet 130'/270/280 do not require welding and cutting on railcar beds, which reduces the time to load tower sections on the railcars.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

Various details of loads, materials, strengths, forces, and the like are omitted in the description, but would be appreciated by one skilled in the art having the benefit of the present disclosure. Although expressly described for use with tower sections, the assembly 100 can be used to transport any type of cylindrical items, including drums, pipes, stacks, etc.

What is claimed is:

1. A support for transporting a tower section of a wind turbine on a bed of a transport device, the tower section having a longitudinal length between first and second ends, having an outer surface, and having a circumference, the support comprising:

a base being configured to affix to the bed of the transport device, the base having opposing ends, lateral sidewalls, and first racks, the lateral sidewalls extending between the opposing ends and disposed adjacent to one another with a space therebetween, the first racks disposed in the space between the lateral sidewalls and extending in opposing lateral directions, each of the lateral sidewalls defining a pair of first slots therein;

a pair of saddles configured to position opposing one another in the space between the lateral sidewalls of the base, each saddle having a top end, a bottom end, and two lateral sides, each top end having a cradle surface pivotable about a pivot point, each bottom end having a second rack configured to engage one of the first racks, each of the lateral sides defining a second slot therein; and a plurality of keys configured to position in the second slots in the lateral sides of the saddles aligned with the first slots in the lateral sidewalls of the base, wherein the keys positioned in the first and second slots are configured to prevent vertical movement of the saddles from the bed; and wherein the first and second racks engaged with one another are configured to prevent lateral movement of the saddles relative to the base.

2. The support of claim 1, further comprising padding configured to be positioned between the support and the circumference of the tower section.

3. The support of claim 1, wherein the base defines:
side openings configured to affix with fasteners to sidewall tabs of a plurality of bed supports; and
end openings configured to affix with fasteners to endwall tabs of the plurality of bed supports.

4. The support of claim 1, wherein each saddle has a hinge as the pivot point; and wherein each cradle surface is connected to the hinge of the respective saddle.

5. The support of claim 1, wherein each saddle defines a first curvature configured to face the circumference; and wherein each cradle surfaces defines a second curvature configured to face the circumference.

6. The support of claim 1, wherein the base comprises a pad disposed across the space between the lateral sidewalls and centrally located on the base.

7. The support of claim 1, wherein each of the first slots in the base is an elongated slot defined laterally in the respective lateral sidewall; and wherein each of the second slots of the saddle is an aperture defined in the respective lateral side, the aperture on the lateral side being adjustably alignable with the elongated slot in the lateral sidewall adjacent thereto, the key being configured to affix between the aperture aligned with the elongated slot.

8. The support of claim 1, wherein each of the keys has a shoulder at one end and has a pin hole at an opposite end, the shoulder configured to fit adjacent one of the lateral sidewalls or lateral sides, the pin hole configured to receive a retaining pin.

9. The support of claim 1, wherein the support comprises a lashing connected to the support and configured to be lashed about the portion of the tower section.

10. A system for transporting a tower section of a wind turbine, the tower section having a longitudinal length between first and second ends, having an outer surface, and having a circumference, the system comprising:
a transport device having a bed, the bed having a bed length and having a plurality of support locations disposed thereon;
at least one support according to claim 1 being affixable on the bed at one of the support locations.

11. The system of claim 10, wherein the at least one support is at least one intermediate support affixable on the bed at at least one intermediate of the support locations on the bed, the system further comprising:
first and second end supports comprising a flange affixable to the first end of the tower section, the second end support being affixable to the second end of the tower section, at least one of the first and second end supports being longitudinally adjustable relative to the bed to accommodate the section length of the tower section.

12. The system of claim 11, wherein a respective one of the first and second support locations for the at least one longitudinally adjustable end support comprises a rail disposed longitudinally on the bed, the at least one adjustable end support being adjustably affixable to the rail.

13. The system of claim 11,
wherein the at least one longitudinally adjustable end support comprises the first end support having the flange affixable to the end of the tower section;
wherein the at least one longitudinally adjustable end support comprises the second end support comprising at least one anchor affixable to the second end of the tower section and connected by at least one line affixable to the second support location on the bed; or
wherein the second end support comprises a second flange affixable between the bed and the second end of the tower section.

14. The system of claim 10, wherein the at least one support comprises a flange affixable to one of the first and second ends of the tower section.

15. The system of claim 10, wherein each of the support locations comprises one or more tabs disposed on the bed of the transport device and being configured to restrain at least one intermediate support positionable thereon at least laterally and longitudinally on the bed; and wherein the at least one support is affixable by fasteners to the one or more tabs disposed on the bed.

16. The system of claim 10, wherein the transport device is selected from the group consisting of a railroad car, a flatcar, a vessel, a ship, a tug, a barge, a truck, a trailer, a pallet, and a shipping container.

17. A method of transporting a tower section of a wind turbine, the tower section having a longitudinal length and a circumference, the method comprising:
positioning at least one support at at least one location on the bed of the transport device;
adjusting a lateral separation between longitudinal pivots disposed on opposing saddles to accommodate the circumference of the tower section by positioning the opposing saddles in a lateral direction on the at least one support;
preventing longitudinal movement of the opposing saddles by engaging lateral sides of the opposing saddles with lateral sidewalls of the at least one support;
preventing lateral movement of the opposing saddles in the lateral direction by engaging first racks disposed on the opposing saddles with second racks disposed on the at least one support;
providing a slot in each lateral sidewall of the at least one support and providing a slot in each lateral side of the opposing saddles;
preventing vertical movement of the opposing saddles in a vertical direction from the bed by engaging a respective key in a pair of adjacent slots formed by a respective lateral sidewall of the at least one support and a respective lateral side of one of the opposing saddles; and
loading the tower section on the transport device by supporting the circumference of the tower section on pivoting cradle surfaces pivotable about the longitudinal pivots on disposed on the opposing cradle saddles and allowing the pivoting cradle surfaces to pivot in a radial direction about the longitudinal pivots to accommodate the circumference of the tower section.

18. The method of claim 17, wherein engaging the first racks disposed on the opposing saddles with the second racks disposed on the at least one support comprises engaging teeth of the first racks disposed on bottom ends of the of the opposing saddles with teeth of the second racks disposed on a base of the at least one support.

19. The method of claim 17, wherein engaging the keys in the slots aligned between the lateral sidewalls of the at least one support and the lateral sides of the opposing saddles comprises extending each key through a slot in the lateral side aligned with a laterally elongated aperture for a slot in the lateral sidewall.

* * * * *